United States Patent
Koskan et al.

(10) Patent No.: US 9,382,466 B2
(45) Date of Patent: Jul. 5, 2016

(54) METHOD FOR INHIBITING SCALE FORMATION IN OIL WELLS

(71) Applicants: Larry P. Koskan, Orland Park, IL (US); Abdul R. Meah, Bridgeview, IL (US)

(72) Inventors: Larry P. Koskan, Orland Park, IL (US); Abdul R. Meah, Bridgeview, IL (US)

(73) Assignee: Global Green Products LLC, Dover, DE (US)

( * ) Notice: Subject to any disclaimer, the term of this patent is extended or adjusted under 35 U.S.C. 154(b) by 0 days.

(21) Appl. No.: 13/883,544

(22) PCT Filed: Feb. 28, 2013

(86) PCT No.: PCT/US2013/028425
§ 371 (c)(1),
(2) Date: May 3, 2013

(87) PCT Pub. No.: WO2013/130884
PCT Pub. Date: Sep. 6, 2013

(65) Prior Publication Data
US 2014/0116709 A1    May 1, 2014

Related U.S. Application Data

(60) Provisional application No. 61/605,036, filed on Feb. 29, 2012.

(51) Int. Cl.
*E21B 43/16*    (2006.01)
*C09K 8/52*    (2006.01)
(Continued)

(52) U.S. Cl.
CPC . *C09K 8/52* (2013.01); *C09K 8/528* (2013.01); *E21B 37/06* (2013.01); *E21B 43/16* (2013.01); *E21B 43/26* (2013.01)

(58) Field of Classification Search
CPC ............ C09K 8/882; C09K 8/54; C09K 8/74; C09K 8/528; C09K 8/76; C09K 8/524
See application file for complete search history.

(56) References Cited

U.S. PATENT DOCUMENTS 5,335,732 A * 8/1994 McIntyre .............. E21B 33/124
                                                166/250.01
5,357,004 A    10/1994 Calton et al.
(Continued)

FOREIGN PATENT DOCUMENTS

| CN | 102146161 | 8/2011 |
| WO | 97/28230 A1 | 8/1997 |

(Continued)

OTHER PUBLICATIONS

All Foreign Documents and Non-Patent Literature Has Been Previously Provided in Parent U.S. Appl. No. 13/781,367, filed Mar. 28, 2013.
(Continued)

*Primary Examiner* — Angela M DiTrani
(74) *Attorney, Agent, or Firm* — Seager, Tufte & Wickhem, LLP

(57) ABSTRACT

An amount of treatment water injected into a subterranean well may be reduced by providing an environmentally friendly polymer, such as a biodegradable polymer (e.g., an aspartic acid based polymer), to the subterranean well. In some cases, the aspartic acid based polymer may include one or more of a copolymer of the aspartic acid based polymer, a terpolymer of the aspartic acid based polymer, an aspartic acid based polymer derivative, an aspartic acid based polymer having an end cap, and a soluble salt of the aspartic acid based polymer. In some cases, the treatment water use may be reduced within the range of about five percent to about ninety five percent.

23 Claims, 24 Drawing Sheets

(51) Int. Cl.
*C09K 8/528* (2006.01)
*E21B 37/06* (2006.01)
*E21B 43/26* (2006.01)

(56) References Cited

U.S. PATENT DOCUMENTS

| | | | | |
|---|---|---|---|---|
| 5,411,889 | A | * | 5/1995 | Hoots et al. .................. 436/6 |
| 5,497,831 | A | * | 3/1996 | Hainey .................. E21B 43/26 166/250.1 |
| 5,755,972 | A | | 5/1998 | Hann et al. |
| 6,022,401 | A | | 2/2000 | Tang et al. |
| 6,148,913 | A | | 11/2000 | Collins |
| 6,173,780 | B1 | | 1/2001 | Collins et al. |
| 6,635,604 | B1 | | 10/2003 | Halliday et al. |
| 6,913,081 | B2 | | 7/2005 | Powell et al. |
| 7,028,776 | B2 | | 4/2006 | Kirk |
| 7,977,283 | B2 | | 7/2011 | Gupta et al. |
| 8,101,554 | B2 | | 1/2012 | Montgomerie et al. |
| 2003/0196809 | A1 | * | 10/2003 | Willberg et al. ............. 166/300 |
| 2009/0151944 | A1 | * | 6/2009 | Fuller et al. ............... 166/280.2 |
| 2009/0170732 | A1 | | 7/2009 | Montgomerie et al. |
| 2010/0300684 | A1 | * | 12/2010 | Kotsonis et al. ......... 166/250.05 |
| 2012/0217012 | A1 | | 8/2012 | Darby |
| 2013/0031972 | A1 | * | 2/2013 | Freese .................. C09K 8/62 73/152.18 |
| 2014/0182844 | A1 | * | 7/2014 | Wutherich ............. E21B 43/26 166/250.02 |

FOREIGN PATENT DOCUMENTS

| | | | | |
|---|---|---|---|---|
| WO | WO97/28230 | * | 8/1997 | .............. C09K 7/00 |
| WO | 2004011772 A1 | | 2/2004 | |

OTHER PUBLICATIONS

Frigo et al., "Chemical Inhibition of Halite Scaling in Topsides Equipment," Society of Petroleum Engineers, 7 pages, Jan. 2000.
Harris et al., "Biodegration and Testing of Scale Inhibitors," Chemical Engineering, 6 pages, Apr. 1, 2011.
Kumar, "Polyaspartic Acid—A Versatile Green Chemical," pp. 162-167, Dec. 18, 2012. ISSN 2278-6783.
Mocanu et al., "Poly(Aspartic Acid)—Review," Department of Pulp. Paper, and Fibers—Technical University, 49 pages, before Mar. 2013.
Spica et al., "Successful Deployment of a Green Multifunctional Scale Inhibitor, A Case Study from the Rockies," Society of Petroleum Engineers, 10 pages, 2012.
International Search Report for Correspondence Serial No. PCT/US2013/028425 dated May 6, 2013.
Wang et al., "Halite Precipitation and Permeability Assessment During Supercritical CO2 Core Flood," 12 pages, Oct. 2010.
Rogers et al., "Use of Inhibitors for Scale Control in Brine-Producing Gas and Oil Wells," 6 pages, Feb. 1990.
Ali et al., "Matrix Treatment Arrests Production Decline in Deepwater GOM well," vol. 224, No. 11, 4 pages, Printed Feb. 25, 2013.
Chen, T., et al., "Understanding the Mechanisms of Halite Inhibition and Evaluation of Halite Scale Inhibitor by Static and Dynamic Tests", SPE International Symposium on Oilfield Chemistry, Apr. 20-22, The Woodlands, Texas, 2009 (8 pgs).

* cited by examiner

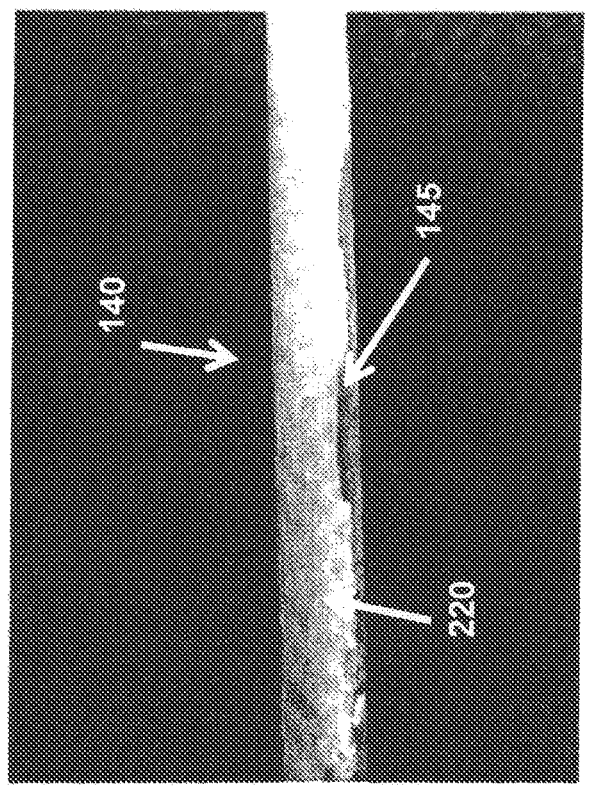

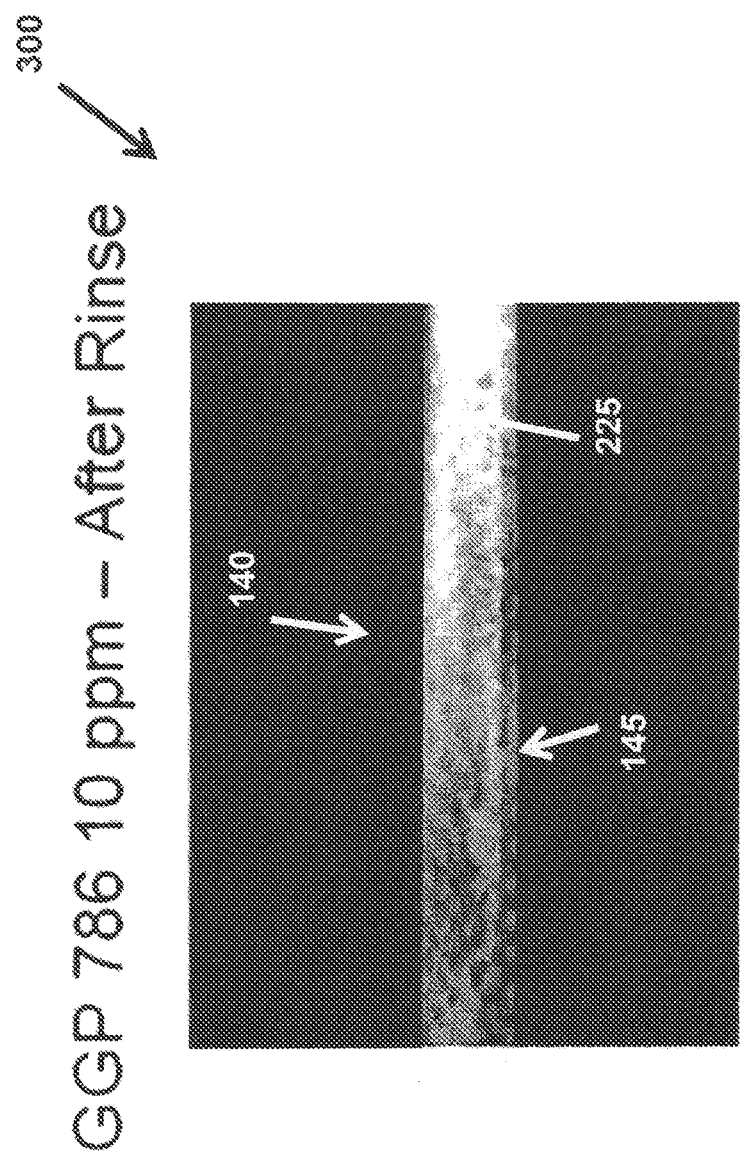

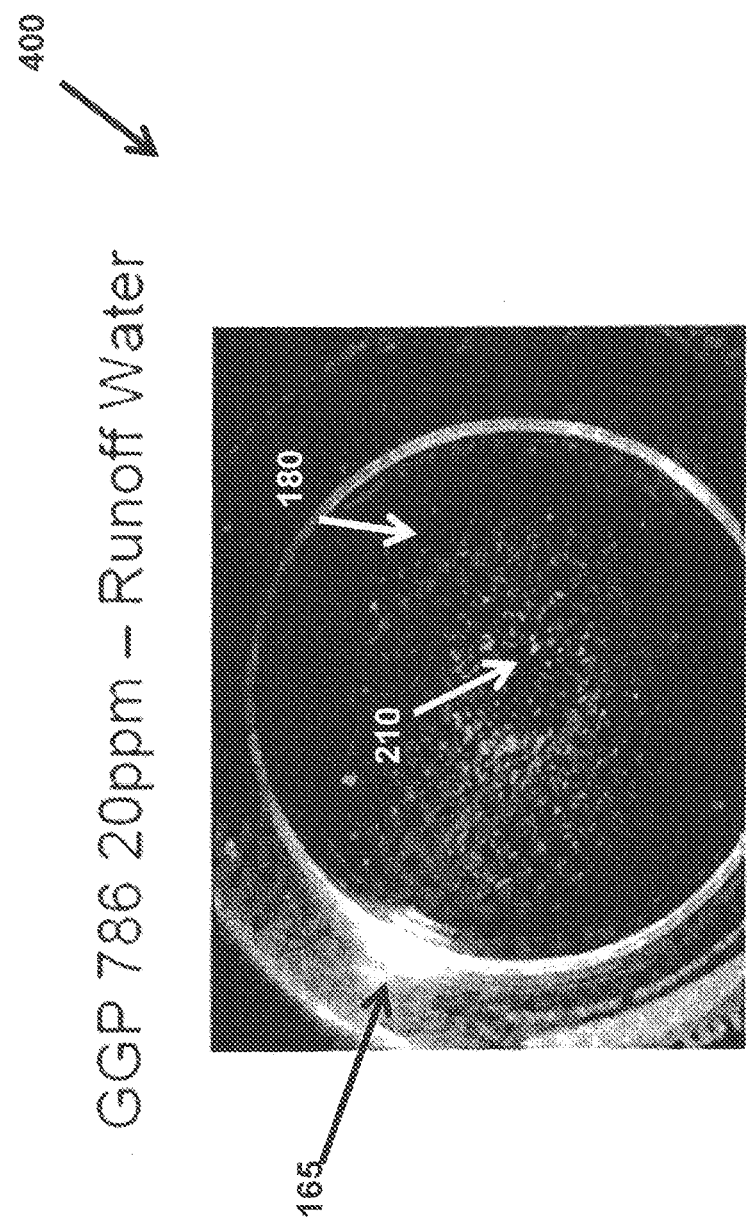

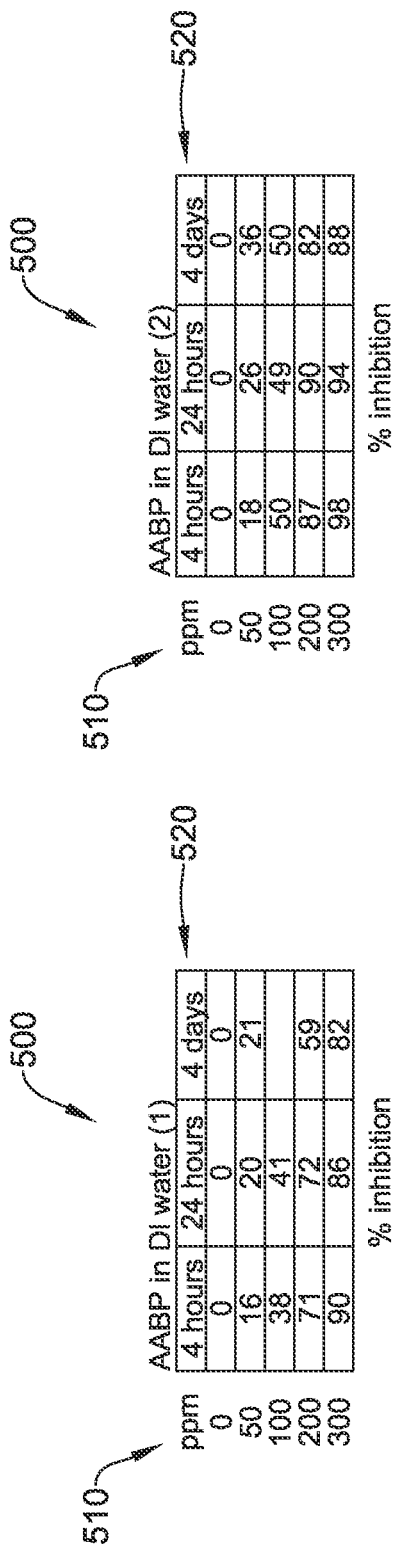
Figure 5A
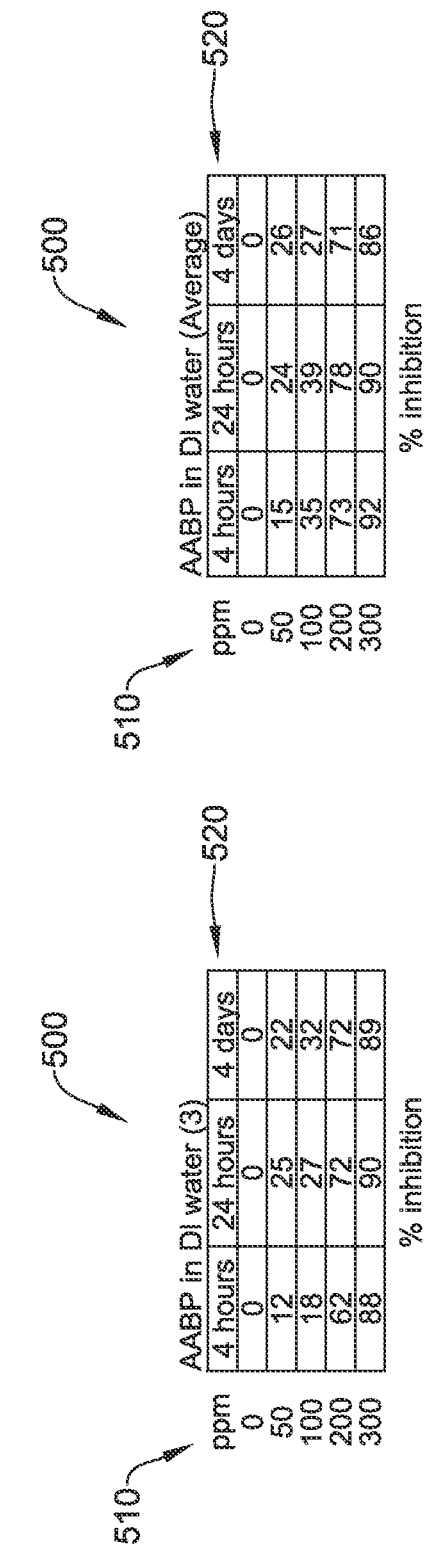
Figure 5B
Figure 5C
Figure 5D

4 hours, 100ml, AABP/NaCl

| ppm | g | % |
|---|---|---|
| 0 | | 0 |
| 50 | 4.49 | 0 |
| 100 | 3.83 | 15 |
| 200 | 2.14 | 52 |
| 300 | 0 | 100 |

Figure 10

4 hours, 100ml, AABP/NaCl+CaCl2

| ppm | g | % |
|---|---|---|
| 0 | | 0 |
| 50 | 2.3 | 21 |
| 100 | 1.82 | 63 |
| 200 | 0.84 | 78 |
| 300 | 0.5 | 91 |
| | 0.2 | |

Figure 9

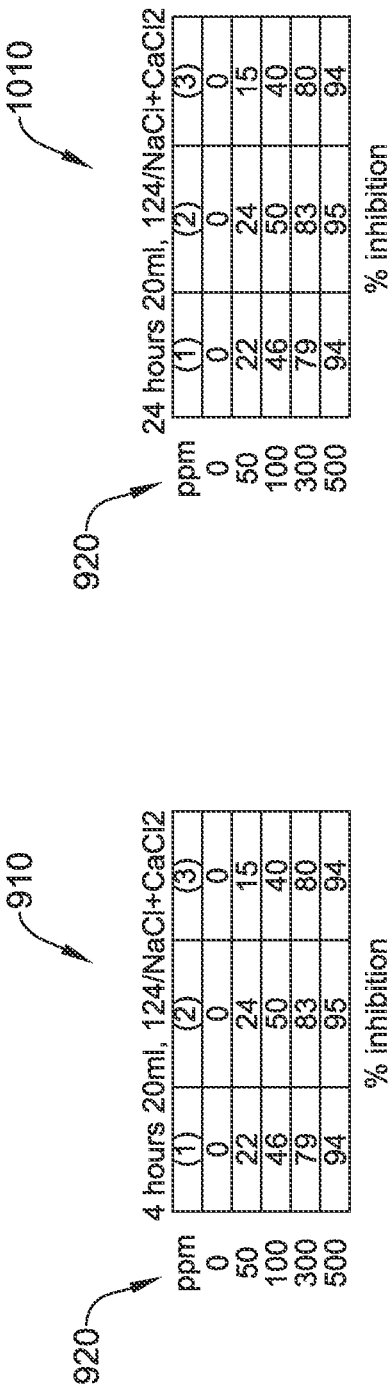

|       | 0 g     | 0.25 g  | 0.5 g   | 0.75 g  | 1.25 g  |
|-------|---------|---------|---------|---------|---------|
| Water | 0.9339  | 0.6469  | 0.3880  | 0.2703  | 0.0556  |
| LMW   | 0.6234  | 0.5242  | 0.3421  | 0.2760  | 0.0204  |
| Diff %| 33.25%  | 18.97%  | 11.83%  | -2.11%  | 63.31%  |
| HMW   | 0.6899  | 0.4656  | 0.3600  | 0.2223  | 0.0131  |
| Diff %| 26.13%  | 28.03%  | 7.22%   | 17.76%  | 76.44%  |

Figure 13

METHOD FOR INHIBITING SCALE FORMATION IN OIL WELLS

RELATED APPLICATION

This application claims priority to U.S. Provisional Patent Application Ser. No. 61/605,036, filed Feb. 29, 2012 and entitled "METHOD FOR INHIBITING SCALE FORMATION IN OIL WELLS," which is hereby incorporated by reference.

TECHNICAL FIELD

The present invention relates generally to controlling scale formation in hydrocarbon producing wells, and more specifically to inhibit scale formation by controlling the formation of halite scale in hydrocarbon producing wells.

BACKGROUND

In some cases, well bores drilled into hydrocarbon containing rock formations may allow for oil to be extracted substantially free of impurities. However, many hydrocarbon containing rock formations include water having a particular mineral content (e.g., calcium, magnesium, sulfur, sodium, iron, etc.). This water may have been trapped during the formation of the rock, such as connate water, or may have been naturally introduced to the rock formation later, such as interstitial water, and are often referred to as brines. These brines may have a relatively high dissolved mineral content and may contain high concentrations of dissolved salts. Brines and/or other formation waters may be found within the pores of the rock formations with the hydrocarbon, within pores of the rock formations separate from the hydrocarbons, or may be found in rock formations without hydrocarbons.

SUMMARY

During the operation of a hydrocarbon producing well, halite scale may form from the brines present in the associated rock formations leading to reduced production of the well and/or expensive remediation procedures. In some cases, treatment water obtained from a low salinity source, such as a fresh water source, may be used to control scale formation by diluting and/or dissolving halite deposits. However, due to brine incompatibility, calcium carbonate, barium sulfate, and/or other mineral scales may form. Also, the use of the treatment water and/or disposal of the formation water separated from the obtained hydrocarbon may lead to increased cost of operation of the hydrocarbon producing well. Many common scale inhibitors are not environmentally friendly and may contaminate nearby ground water sources, such as those used for drinking wells. As such, an improved system and method of controlling halite scale formation while minimizing both the amount of treatment water used and the environmental impact of the operation of the hydrocarbon producing well is desired.

In some cases, an illustrative method of reducing an amount of treatment water injected into a subterranean well may include providing an environmentally friendly polymer, such as a biodegradable polymer (e.g., an aspartic acid based polymer), to the subterranean well. In some cases, the aspartic acid based polymer may include one or more of a copolymer of the aspartic acid based polymer, a terpolymer of the aspartic acid based polymer, an aspartic acid based polymer derivative, an aspartic acid based polymer having an end cap, and a soluble salt of the aspartic acid based polymer. In some cases, the treatment water use may be reduced within the range of about five percent to about ninety five percent.

In some cases, an illustrative method for inhibiting halite scale formation in a subterranean well may include providing treatment water into the subterranean well and providing an aspartic acid based polymer to the subterranean well. The illustrative method may further include adjusting a concentration of the aspartic acid based polymer in the treatment water. In some cases, the illustrative method may include injecting the treatment water into the subterranean well at a first specified rate and adjusting a rate of injection of the treatment water into the subterranean well to a second rate of injection, wherein the second rate of injection is less than a first rate of injection. In some cases, the scale inhibitor may be provided at a rate and/or concentration configured to reduce or minimize the amount of freshwater supplied to the well bore.

An illustrative system for reducing or minimizing scale formation in a subterranean well may include a water source and an aspartic acid based polymer. Water may be obtained from the water source and provided to the subterranean well to at least partially inhibit scale formation within the well. The aspartic acid based polymer may be provided to the subterranean well at a specified concentration in the water obtained from the water source. In some cases, the illustrative system may include a controller. The controller may be configured to control the rate of flow of the water provided to the subterranean well and/or to control the concentration of the aspartic acid based polymer in the water provided to the subterranean well.

The preceding summary is provided to facilitate an understanding of some of the innovative features unique to the present invention and is not intended to be a full description. A full appreciation of the invention can be gained by taking the entire specification, claims, drawings, and abstract as a whole.

BRIEF DESCRIPTION OF THE DRAWINGS

The invention may be more completely understood in consideration of the following detailed description of various embodiments in connection with the accompanying drawings, in which:

FIGS. 2A-2D shows illustrative experimental results obtained using the laboratory experiment of FIG. 1 for untreated brine;

FIGS. 3A-3D shows illustrative experimental results obtained using the laboratory experiment of FIG. 1 for brine treated with a polymer at a rate of 10 ppm;

FIGS. 4A-4D shows illustrative experimental results obtained using the laboratory experiment of FIG. 1 for brine treated with a polymer at a rate of 20 ppm;

FIGS. 5A-5D show experimental results for a series of jar tests using a mixture of scale inhibitors and deionized water over different durations;

FIGS. 9 and 10 show experimental results from a from a series of experimental jar tests for particular concentrations levels of the aspartic acid based polymer in different brine formulations;

FIGS. 11 and 12 show experimental results from a from a series of experimental jar test for particular concentrations levels of an aspartic acid based polymer in different brine formulations;

FIG. 13 shows experimental results for a series of jar tests comparing scale inhibition of different aspartic acid based polymers having different molecular weights;

Figure 1:
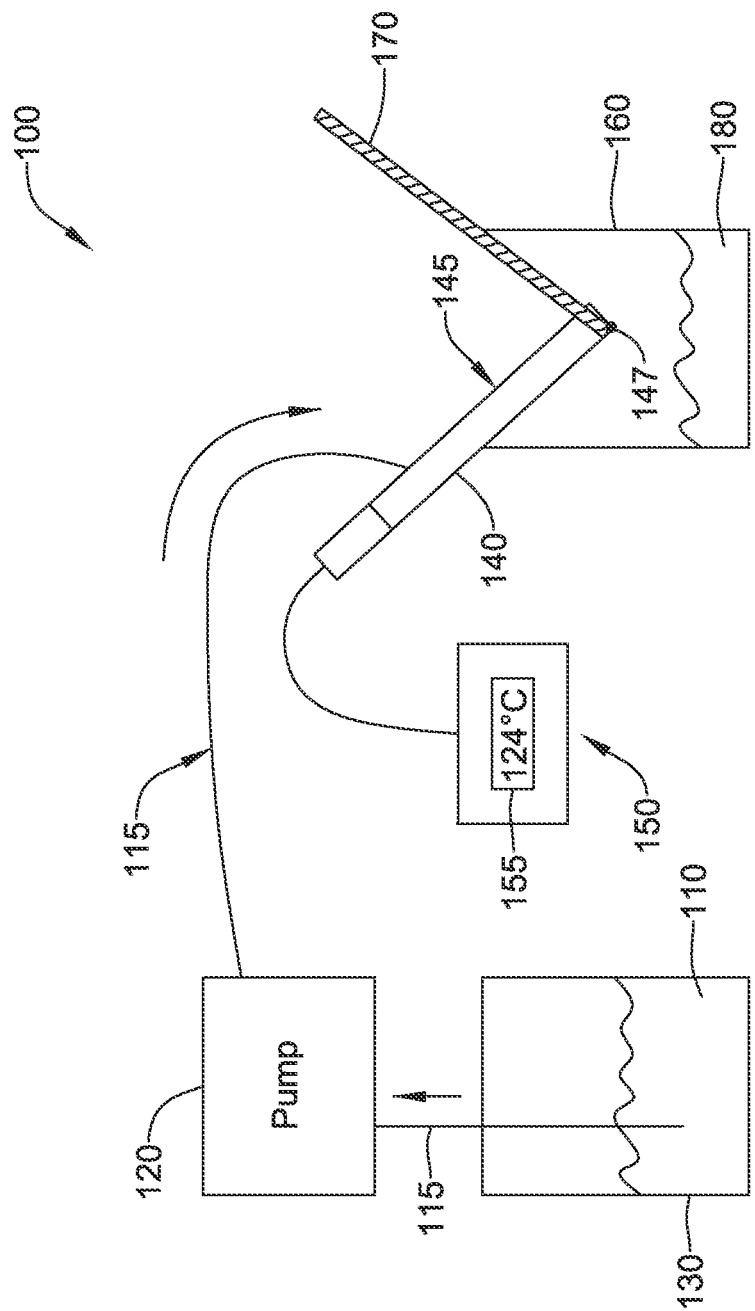
FIG. 1 shows an illustrative laboratory experiment for use in simulating scale formation caused by brine of a hydrocarbon containing formation.

While the invention is amenable to various modifications and alternative forms, specifics thereof have been shown by way of example in the drawings and will be described in detail. It should be understood, however, that the intention is not to limit aspects of the invention to the particular embodiments described. On the contrary, the intention is to cover all modifications, equivalents, and alternatives falling within the spirit and scope of the invention.

DESCRIPTION

The following description should be read with reference to the drawings wherein like reference numerals indicate like elements throughout the several views. The detailed description and drawings show several embodiments which are meant to illustrative of the claimed invention.

In some cases, oilfield waters are mixed with the hydrocarbons of the oil fields. For example, in the oilfields in North Dakota, the hydrocarbons may occur in formations mixed with approximately equal amounts of brine. When the hydrocarbons (e.g., crude oil, natural gas, etc.) are captured, the brines may be separated from the hydrocarbons and may be disposed, such as by injecting the recovered brines into deep disposal wells. Brines and other oilfield waters may vary in mineral composition and/or mineral concentrations, often based on a geographical location. For example, the mineral content of brines in some locations, such as North Dakota, may be predominated by chlorides. In some examples, the brines may have a high salinity and may include approximately 90% sodium chloride (NaCl), also called halite. The high salinity brine may include other salts such as calcium chloride ($CaCl_2$) and magnesium chloride ($MgCl_2$). In one example, a thousand gallons (e.g., about 24 barrels) of a high salinity brine may contain over a ton of NaCl. An illustrative brine composition, including approximate ion concentration levels, is presented below in Table 1.

TABLE 1

Illustrative ion concentrations in an illustrative high salinity brine.

| Ion | Concentration (mg/L) |
| --- | --- |
| $Na^+$ | 109,843 |
| $Ca^{2+}$ | 24,653 |
| $Mg^{2+}$ | 1,740 |
| $K^+$ | 8,265 |
| $Ba^{2+}$ | 55 |
| $Sr^{2+}$ | 986 |
| $Fe^{2+}/Fe^{3+}$ | 3 |
| $Cl^-$ | 202,950 |
| $HCO_3^-$ | 153 |

"Understanding the Mechanisms of Halite Inhibition and Evaluation of Halite Scale Inhibitor by Static and Dynamic Tests" (SPE International Symposium on Oilfield Chemistry, 20-22 Apr. 2009, The Woodlands. Texas) by Tao Chen, et al., states that inhibiting halite scale formation during oil and gas production is difficult because of the concentration levels of halite inhibitors. Further, laboratory tests of halite inhibitors have been difficult to perform and/or reproduce.

Halite scale is one of many scales (e.g., carbonate scale, sulphate scale, etc.) found in the oil and gas industry due to the mineral content of the brines. Halite scales may form by condensation from gas generation, when the temperature of the brine is reduced or other similar reasons. For example, in Northern German gas reservoirs, halite precipitation was seen as the gas was recovered from the formation. Halite may precipitate in and/or near the well bore when brines are present in the formation. Halite scale has been shown to reduce the performance of the wellbore, including decreasing the production rate. In some cases, halite scale may block the flow path through the pores of the rock formations, sometimes causing a well to be abandoned. Halite scale may also form on topside equipment, such as pipes, tubes, pumps, compressors, and the like, when the formation fluid cools and/or evaporates. In one case, halite scale formation was observed in submersible pumps and jet pumps at a particular well site causing lost production during downtime required to remove the scale. In some cases, attempts have been made to control halite scale by using fresh water treatments and/or chemical treatments. Chemical treatments, such as acidic based treatments, have provided limited benefits and/or do not use environmentally friendly products. Fresh water treatments, which introduce fresh water down the well bore during production, often requires a relatively large amount of treatment water to be used at regular intervals. Dilution with treatment water (e.g., fresh water, reclaimed water, formation water, etc.) may be the most common method used today to help control halite scale formation in rock formations having brines with relatively high salinity.

In the production of oil and/or gas from formations that contain areas of high brine, the formation of sodium chloride salt may require the use of extremely large quantities of fresh water to dilute the brine. This dilution may help reduce scale formation in an attempt to prevent the pores in the formation rock, the well bore and the pump equipment from becoming obstructed. However, fresh water in many places may be a limited resource so that it is desirable that a method be found to both reduce freshwater usage and inhibit scale formation in a well bore. In some cases, such as in the oil and/or gas fields of the North Sea, seawater may be used to dilute the brine in the hydrocarbon bearing formation. However, in either case, the mineral content in the fresh water (e.g., bicarbonate) or the sea water (e.g., sulphates) may cause the formation of other scales (e.g., calcium carbonate) and/or cause corrosion of equipment. An illustrative mineral content of an illustrative treatment water source is provided in Table 2, below.

TABLE 2

Illustrative ion concentrations of an illustrative treatment water.

| Ion | Concentration (mg/L) |
|---|---|
| $Na^+$ | 800 |
| $Ca^{2+}$ | 4 |
| $Mg^{2+}$ | 1 |
| $K^+$ | 3 |
| $Ba^{2+}$ | 0.2 |
| $Sr^{2+}$ | 0.2 |
| $Fe^{2+}/Fe^{3+}$ | 0.1 |
| $Cl^-$ | 220 |
| $HCO_3^-$ | 1342 |

It has been found that the use of an aspartic acid based polymer, such as the biodegradable polymer polyaspartic acid, may significantly reduce treatment water usage (e.g., fresh water, sea water, reclaimed water, formation water, reclaimed water, etc.) by reducing adherent scale formation and/or dissolvable scale formation. In some cases, the aspartic acid based polymer may be non-toxic and/or non-hazardous. In some cases, the aspartic acid based polymer may be stable over a wide range of temperatures. In some cases, the aspartic acid based polymer may be biodegradable and may meet the criteria of one or more international standards for biodegradability (e.g., OECD 301, 302, 306, etc.). In one example, the aspartic acid based polymer may be applied with a concentration within the range of 5 parts per million (ppm) to about 1000 ppm, when pumped into the well with the treatment water, and may reduce the treatment water usage by about fifty to about ninety-five percent. In another example, applying an aspartic acid based polymer (e.g., polyaspartic acid, etc.) at a concentration of about 100 ppm within the flow of treatment water introduced into the well bore has been found to allow for a significant reduction of treatment water use.

Many environmental regulations have been implemented around the world to regulate the use and/or characteristics of chemicals used in various industries, such as in the hydrocarbon production industry (e.g., the oil and gas industry). For example, environmental standards have been established to regulate oil and/or gas production from fields in the North Sea region. Any chemical used within the North Sea oilfields must meet those standards. Similarly, in the United States, one or more sets of environmental regulations may be defined by the national and/or state governmental agencies. A clear understanding of the national and local state laws is required when evaluating a chemical for use in hydrocarbon producing wells. For example, in many areas, the toxicity of chemicals used in the fraccing industry is coming under scrutiny of government agencies, environmental watchdog groups and the public at large. As the standards are likely to become more stringent and/or more widely adopted, a need for more environmentally friendly products is needed.

For example, the environmental laws and regulations present in the North Sea region require the evaluation of the environmental profile of chemicals based upon their biodegradation, bioaccumulative and/or toxicity test results. The most recognized tests for measuring biodegradation of chemicals are the standards developed by the Organization for Economic Cooperation and Development (OECD). These OECD tests include methods that may be performed purely in a laboratory environment, in a simulated environment, and/or in a field-based test environment. Biodegradation may be affected by many factors, the tests differ based on the environment of the intended use (e.g. a freshwater environment, a sea water environment, a soil environment, an aquatic sediment environment, a sewage treatment plant environment, etc.) The biodegradation of products used in ocean environments are often evaluated using the OECD 306 test method. Table 3 below includes an overview of the OECD biodegradation tests in relation to the intended use environment and a testing classification.

TABLE 3

OECD biodegradability test overview.

| Test type | Soil | Aquatic Sediment | Sewage treatment plant | Fresh water | Sea water |
|---|---|---|---|---|---|
| Ultimate | | | | | 306 |
| Ready | | | | 301 A-E | 306 |
| Inherent | 304 A | | 302 A | 302 B | |
| Simulation | 307 B | 308 B | 303 A | | |

To achieve the highest biodegradation rating defined by the OECD, a chemical must show biodegradation of greater than 60% over 28 days. A bioaccumulation test evaluates the partition coefficient of a chemical between water and octanol and is expressed as log $P_{ow}$. To be considered non-bioaccumulative, the log $P_{ow}$ of a chemical should have a value of less than 3. However, if the molecule of the chemical has a molecular weight greater than 700, it is not expected to bioaccumulate. Various toxicity tests evaluate the $EC_{50}$ (e.g., paralysis, loss of equilibrium, and/or other sub-lethal endpoints) and $LC_{50}$ (e.g., Death) thresholds for a particular chemical. In the North Sea region, the various standards specify that the $EC_{50}$ and $LC_{50}$ must be greater than 10 mg/L to be considered non-toxic.

Below, Table 4 summarizes the environmental test results for a particular aspartic acid based polymer (e.g., polyaspartate).

TABLE 4

Environmental testing results for an aspartic acid based polymer.

| Test | Result |
|---|---|
| Biodegredation (28 days, OECD 306) | 64% |
| Bioaccumulation (log $P_{ow}$) (OECD 117) | <−5 |
| *Skeletonema costatum* $EC_{50}$ 72 h (mg/L) | >10,000 |
| *Acartia tonsa* $EC_{50}$ 48 h (mg/L) | >9,000 |
| *Scophthalmus maximus* juvenile LC50 96 h (mg/L) | >9,000 |

Based upon these test results, the aspartic acid based polymer would be approved for use in the North Sea due to its favorable environmental profile. As such, the aspartic acid based polymer may be suitable for use in similar applications when environmental impact is of concern.

FIG. 1 shows an illustrative laboratory experiment 100 that may be used for simulating halite scale formation caused by brine of a hydrocarbon containing formation. The illustrative laboratory experiment is designed to test the effectiveness of a polymer, such as an aspartic acid based polymer. In some cases, the aspartic acid based polymer may include one or more of a copolymer of the aspartic acid based polymer, a terpolymer of the aspartic acid based polymer, an aspartic acid based polymer derivative, an aspartic acid based polymer having an end cap, and a soluble salt of the aspartic acid based polymer, such as, for example, polyaspartic acid to at least inhibit halite scale formation from a brine in a heated environment (e.g., a hydrocarbon bearing formation matrix) and/or on a heated surface (e.g. a surface of a piece of equipment). During the experiments, a brine 110 that was not treated was run to simulate the down-hole environment of formation brine water contacting a heated surface, such as equipment (e.g., a pump), the well bore, and/or another surface (e.g., the pore of the rock formation). The brine 110 was formulated to simulate the brine water encountered in a rock formation. For example, the experimental brine water formulation may simulate the brine found in a natural gas and/or crude oil bearing formation, such as in North Dakota. The simulated brine 110 may contain one or more dissolved minerals at various concentrations, as illustrated in Table 1 above. For example, the brine may include sodium ions ($Na^+$), calcium ions ($Ca^{2+}$), magnesium ions ($Mg^{2+}$), sulfide ions, nitrite ions, bromide ions, nitrate ions, chloride ions, carbonate ions and/or other ions capable of forming scale deposits.

In the illustrative experiment 100 of FIG. 1, the brine 110 is pumped 115 by a pump 120 from a first beaker 130 such that the brine 110 flows over a heating element 140 of an immersion heater 150 and the brine 180 then flows into a second beaker 160. In an example, the heating element 140 may be a quartz immersion heater to simulate a heat transfer surface found within a well bore, such as a pore in the rock formation, the side of the well bore, or a surface of a pump or other machinery associated with the well bore. In some cases, the immersion heater 150 may be configured to provide heat within a specified temperature range (e.g., from about 110° C. to about 250° C.). In the example shown, a display 155 may provide a visual representation of the temperature of the heating element 140. In the example shown, the heating element 140 of the immersion heater 150 was configured to produce heat at 124° C.

In some cases, a specified amount of brine 110 was pumped 115 from the first beaker 130 to the second beaker 160 over a specified period of time. In these cases, the brine 110 was configured to primarily flow over the surface 145 of the heating element 140 of the immersion heater 150 before entering the second beaker 160. In one example, an experimental run may pump approximately 250 ml of brine 110, over about 1.5 hours, and the brine 110 was pumped at a substantially constant flow rate (e.g., 3.1 milliliter/minute.) In some cases, the flow rate may be substantially continuous over a duration of time. In other cases, the flow rate may be variable over a duration of time. For example, and in some instances, the flow rate may be specified to be a first specified flow rate for a first duration and a second specified flow rate for a second duration. In some cases, one of the specified flow rates may be about zero. Over the course of each experimental run, a portion of the brine 110 may evaporate. In some cases, approximately 75 milliliter (ml) was lost to evaporation.

Figure 2A:
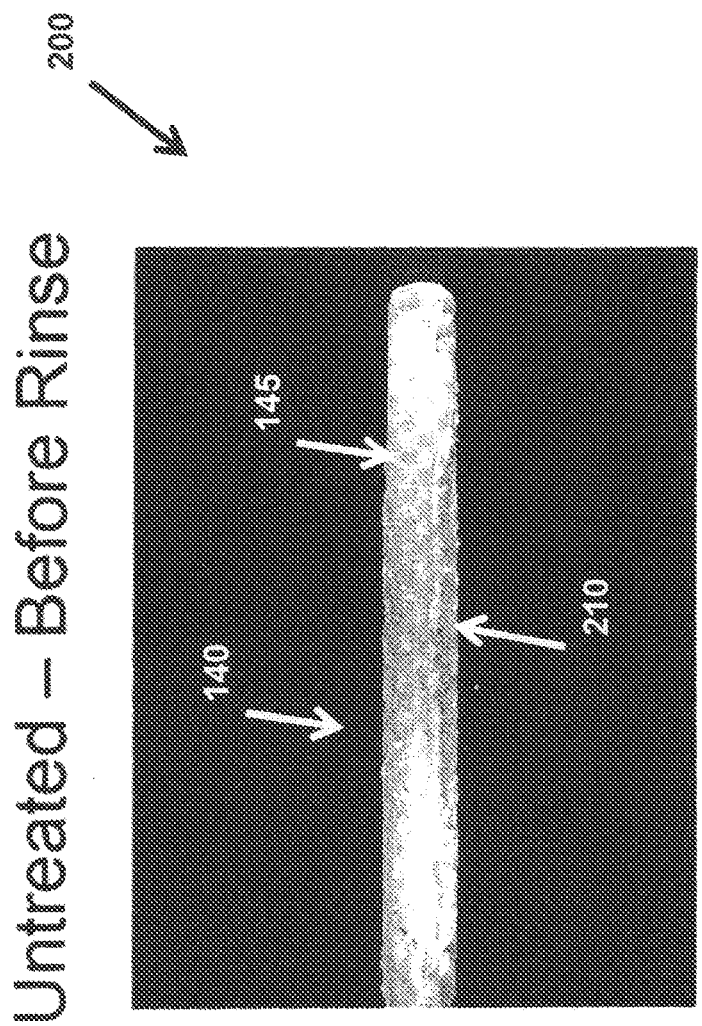
Figure 2B:
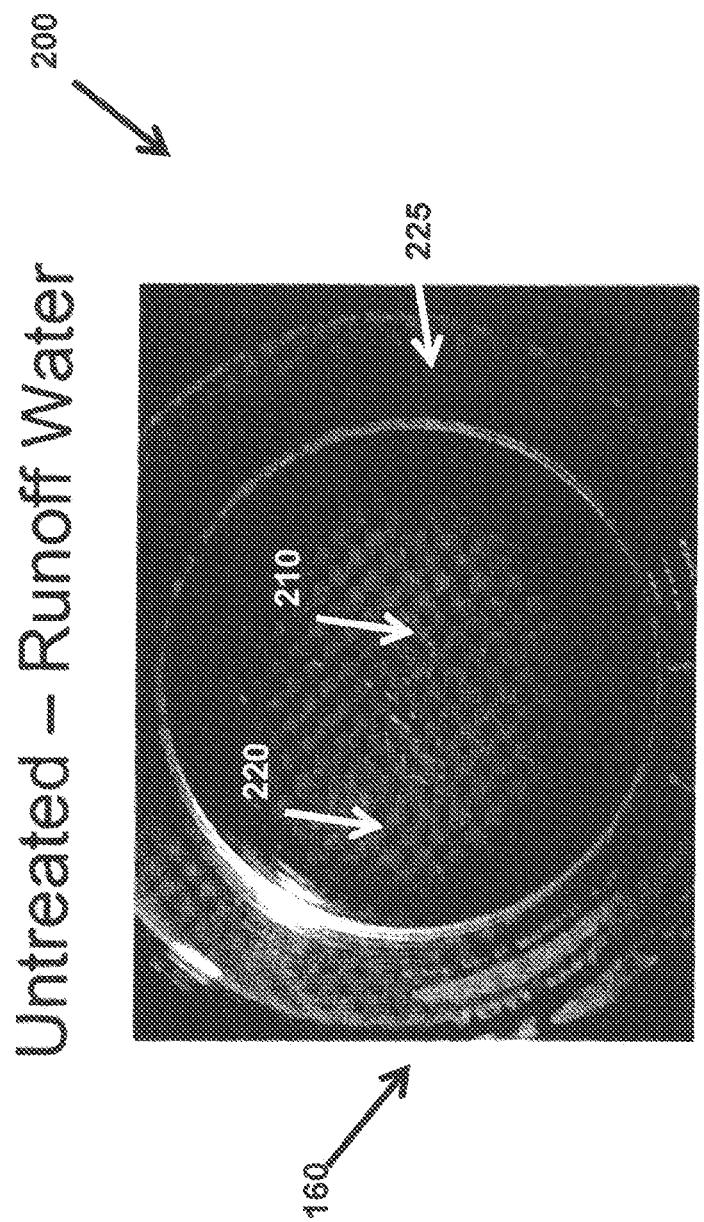

FIGS. 2A-2D show illustrative experimental results 200 obtained using the laboratory experiment 100 of FIG. 1 for untreated brine, such as the brine 110. For these tests, the experimental process outlined above in reference to FIG. 1 was used with the brine 110, without using any scale inhibitor (e.g., no aspartic acid based polymer). In some cases, scale 210 (e.g., halite, calcium carbonate, etc.) forms on the surface 145 of the heating element 140 of the immersion heater 150, which may include one or more of an adherent scale 220, a soluble scale or a non-adherent scale, as shown in FIG. 2A. In some cases, scale 220 may be formed on a surface 225 of the second beaker 160, as shown in FIG. 2B. In some cases, scale 210 may be washed from the surface 145 of the heating element 140 by the brine pumped 115 from the first beaker 130. In such cases, the resulting scale 210 may adhere to a surface 225 of the second beaker 160, or may remain as particulate matter in solution within the second beaker 160. In one example, the brine 110 within the second beaker 160, as shown in FIG. 2B, may be turbid due to either the adherent scale 220 or the particulate matter resulting from scale 210 washed from the heating element 140 by the brine 110.

Figure 2C:
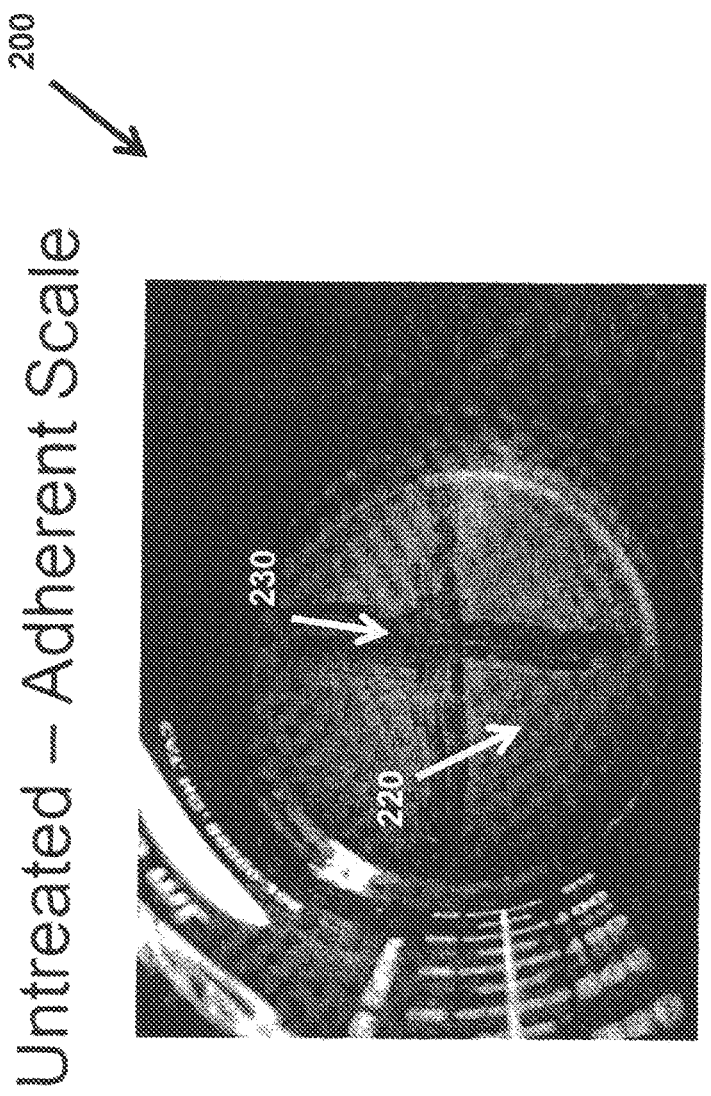
Figure 3A:
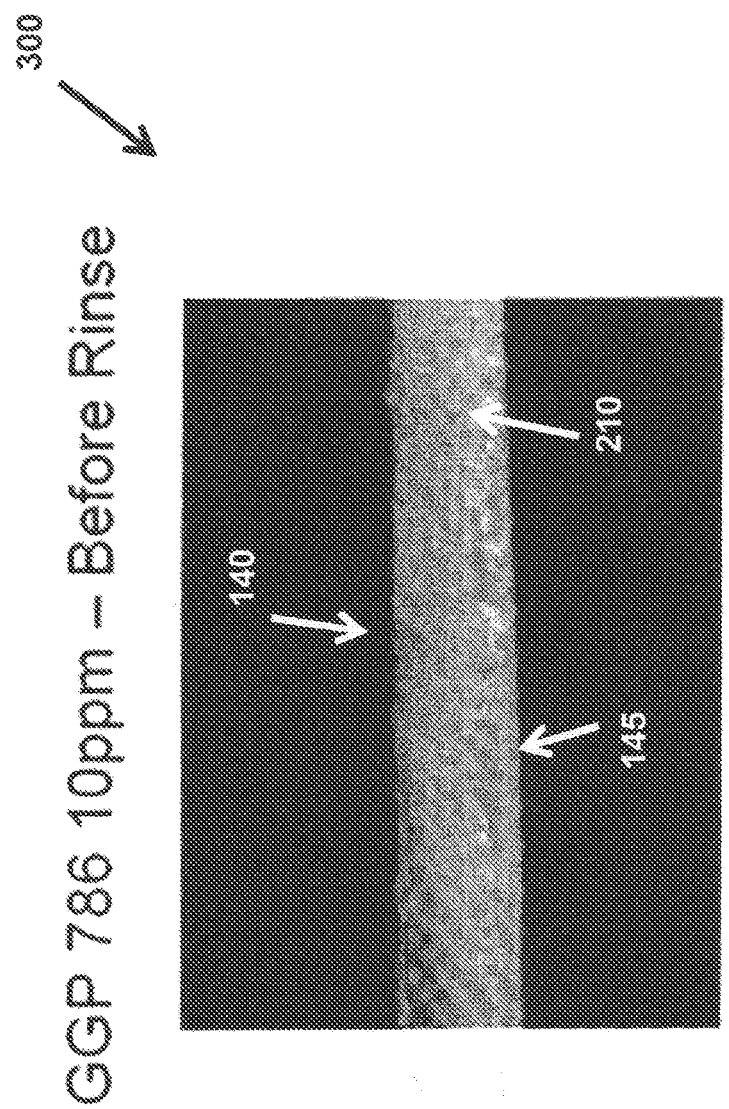
Figure 3B:
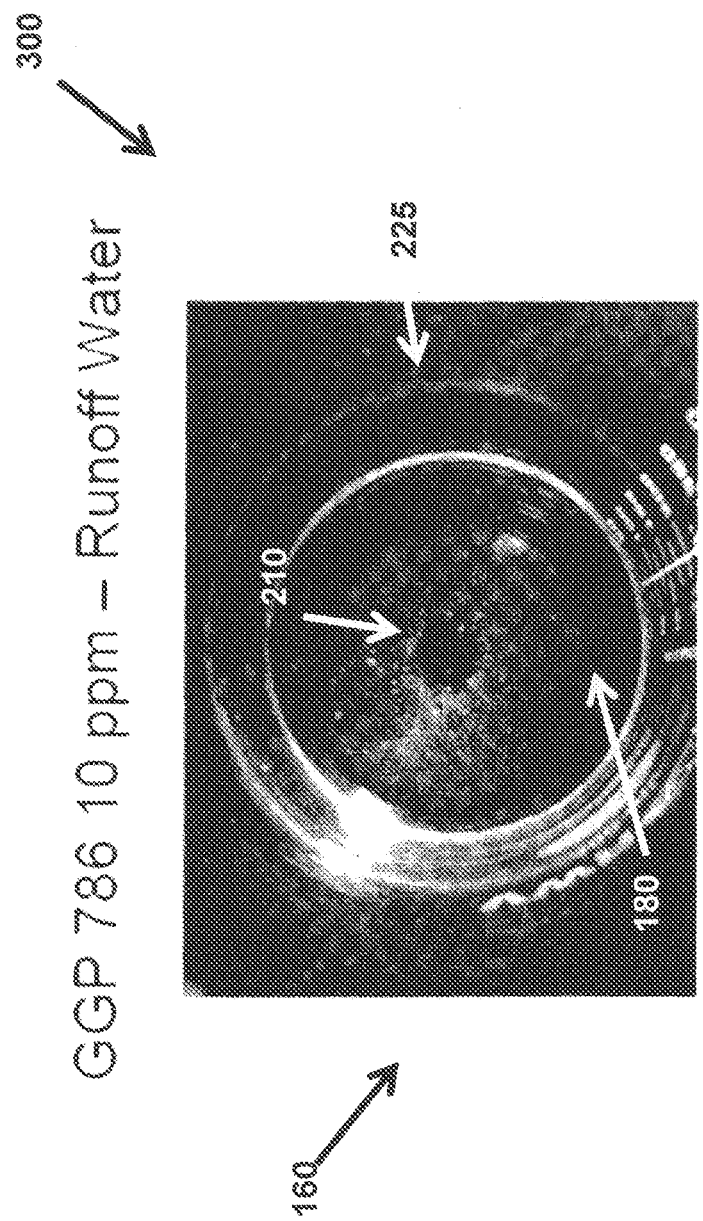
Figure 3C:
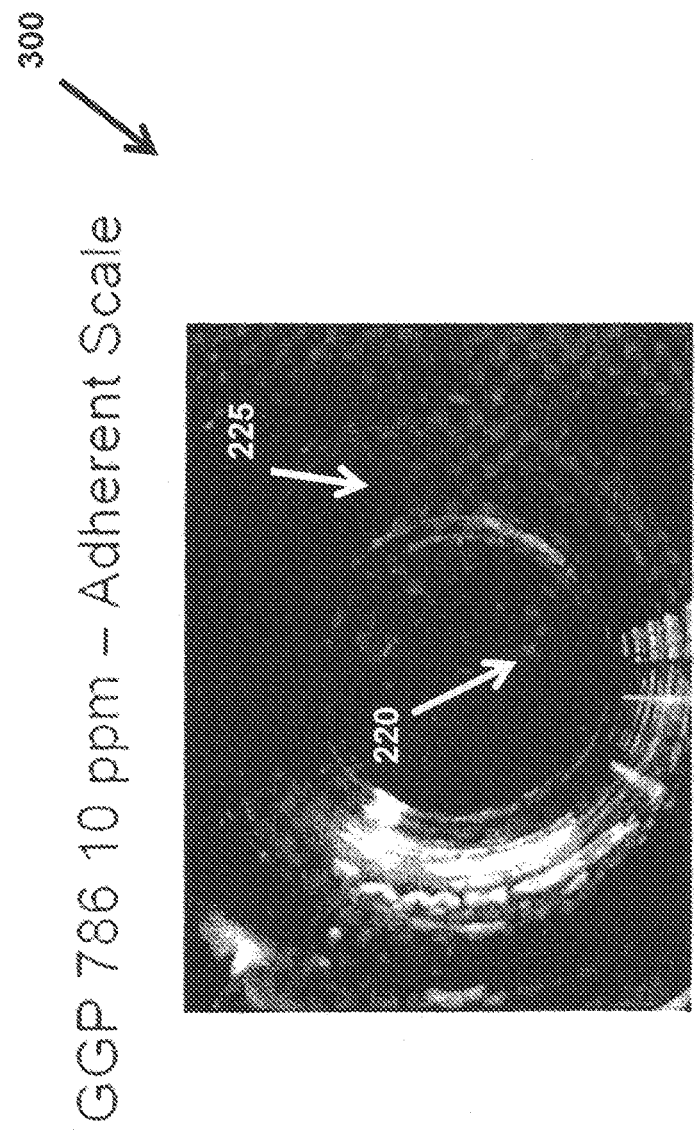
Figure 4A:
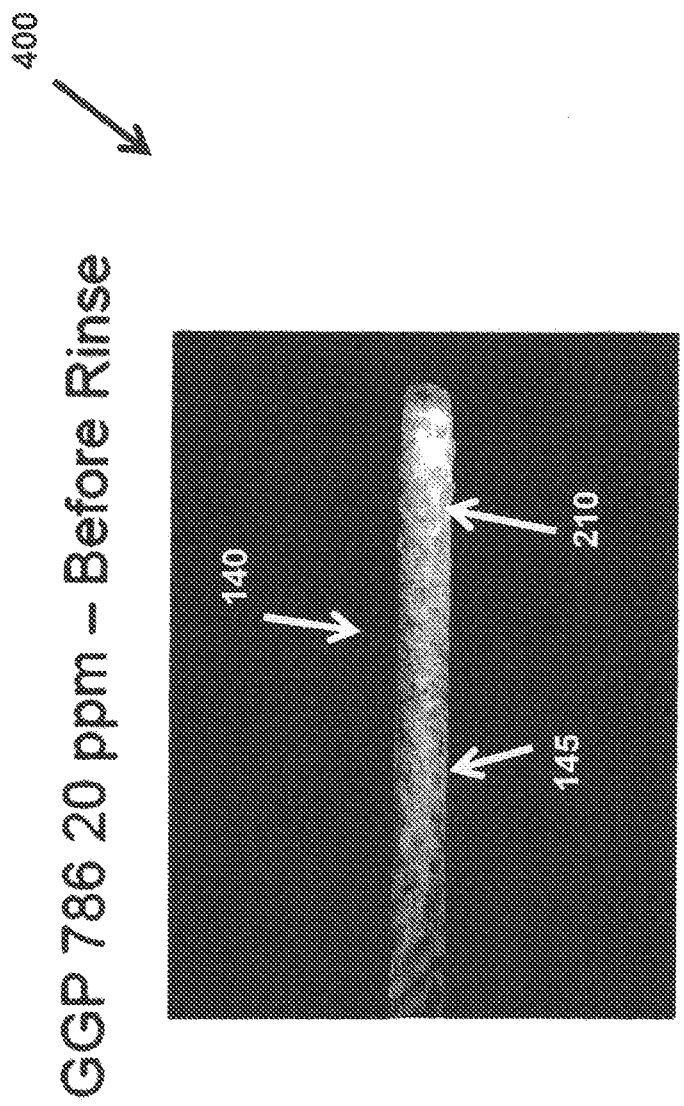
Figure 4C:
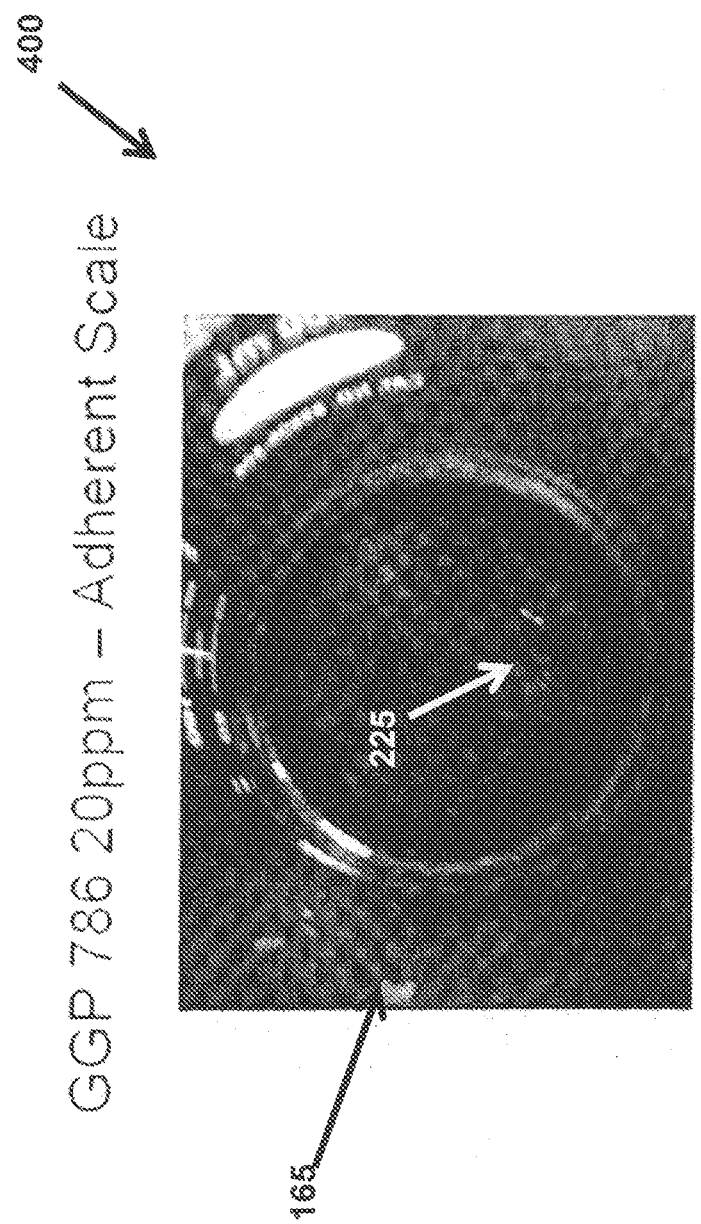
Figure 4D:
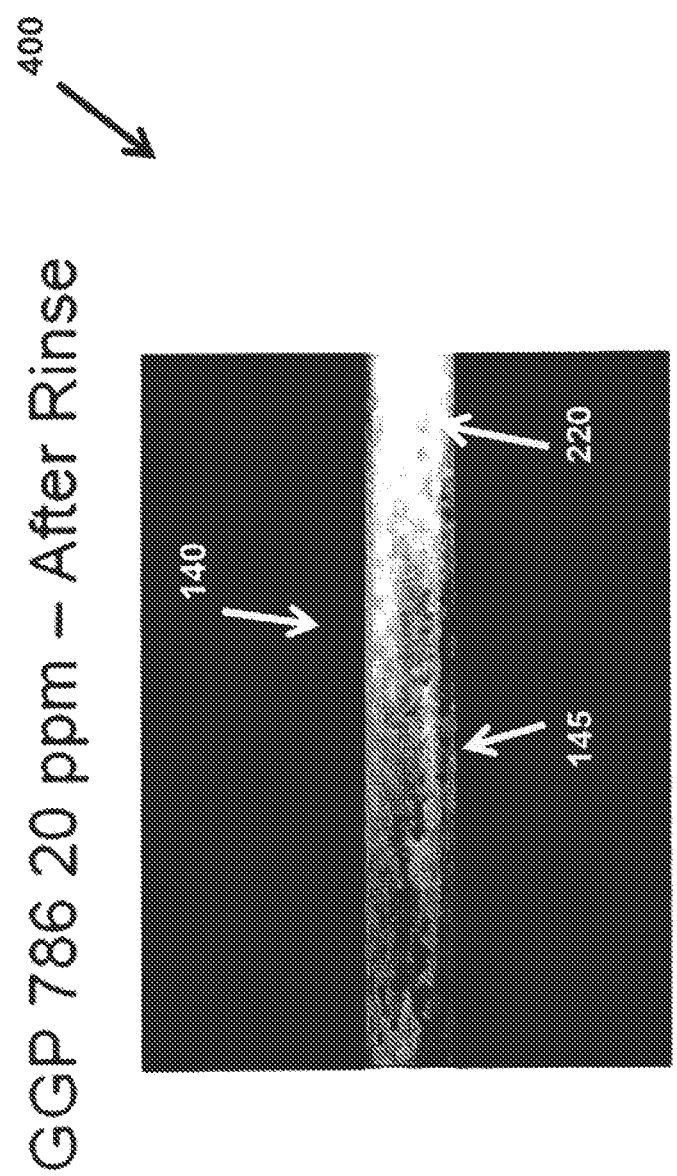

As discussed above, the scales 210, 220 formed may include scales of one or more ions contained in the brine 110. In some cases, the scales 210, 220 may be adherent to one or more surfaces 145, 225 of the experimental setup, such as the heating element 140 and/or the second beaker 160. FIGS. 2C and 2D show the second beaker 160 and the heating element 140 after being rinsed of non-adherent scale and/or soluble scale. After the runoff water (e.g., brine 110) was removed from the second beaker 160, the bottom of the second beaker 160 was scratched 230 with a plastic rod to show the presence of adherent scale 220. Similarly, the heating element 140 was rinsed to remove soluble scale and/or non-adherent scale from the surface 145 of the heating element 140. After rinsing, FIG. 2D shows the adherent scale 220 on the surface 145 of the heating element 140.

In some cases, a thermometer 170 at the distal end 147 of the heating element 140 may be used to monitor the immediate brine temperature as each drop formed at the end 147 of the heating element 140. The brine temperature of each drop as it ran down the heating element 140, increased from 23° C. to about 63° C. before dropping into the second beaker 160. In some cases, the reduced heat transfer caused by the scale 220 formed on the heating element 140 may cause the drop temperature to be reduced (e.g., within a range from about 45° C. to about 55° C.). When the brine 110 was treated with a scale inhibitor, the temperature of each drop may was not reduced as much as had been seen with the untreated brine 110.

FIGS. 3A-3D show illustrative experimental results 300 obtained using the laboratory experiment 100 of FIG. 1 for brine 110 that was treated with an aspartic acid based polymer at a concentration of about 10 ppm. Similarly, FIGS. 4A-4D show illustrative experimental results 400 obtained using the laboratory experiment 100 of FIG. 1 for brine 110 that was treated with an aspartic acid based polymer at a concentration of about 20 ppm. As can be seen in FIGS. 3A, 3B, 4A, and 4B, the addition of the aspartic acid based polymer, such as polyaspartic acid, may reduce the scale 210 (e.g., adherent scale 220, non-adherent scale, and/or soluble scale) on the surface 145, 225 of the heating element 140 and/or the second beaker 160. Increased concentration levels of the aspartic acid based polymer produce a reduction in both adherent scale 220 on the surfaces 145, 225 exposed to the heated brine 110 in FIG. 5A and/or a reduction in turbidity of the brine 180 in the second beaker 160 as shown in FIG. 5B. After rinsing the surface 145 of the heating element 140 and/or the surface 225 of the second beaker 160 to remove non-adherent scales and/or soluble scales, as shown in FIGS. 3C 3D, 4C, and 4D, the adherent scale 220 is reduced in relation to the concentration of the aspartic acid based polymer addition (e.g., increasing the concentration from about 10 ppm to about 20 ppm). The adherent scale 220 of the treated brine 110 is reduced for the non-heated surfaces (e.g., the surface 225 of the second beaker 160) when treating brine 110 with a scale inhibitor, such as an aspartic acid based polymer.

To summarize, an illustrative method of inhibiting scale formation on surfaces associated with a hydrocarbon containing formation may include providing treatment water from a water source into a well bore at a specified flow rate and providing a scale inhibitor, such as a polyaspartic acid based polymer into the well bore with the treatment water, wherein the scale inhibitor is supplied at a specified concentration in relation to the treatment water. In some cases, the specified concentration of the scale inhibitor may be between about 5 ppm and 1000 ppm. In some cases, the specified concentration of the scale inhibitor may be about 100 parts per million. These are just example concentrations. The specified concentration of the scale inhibitor may be formulated to minimize or otherwise reduce the usage rate of the treatment water and/or an amount of treatment water used. In some cases, inhibiting scale formation includes inhibiting halite scale formation, inhibiting calcium carbonate scale formation, or inhibiting halite scale formation and inhibiting calcium carbonate scale formation.

The scale inhibitor may include a biodegradable polymer, such as an aspartic acid based polymer such as, for example, polysuccinimide or polyaspartic acid, and/or one or more of a copolymer of the aspartic acid based polymer, a terpolymer of the aspartic acid based polymer, an aspartic acid based polymer derivative, an aspartic acid based polymer having an end cap, and a soluble salt of the aspartic acid based polymer. In some cases, inhibiting scale formation may include inhibiting the formation of a soluble scale and/or crystal. In some cases, one or more of the treatment water and/or the aspartic acid based polymer may be provided continuously. In some cases, one or more of the treatment water and/or the aspartic acid based polymer may be provided at a variable rate. In some instances, the treatment water and the aspartic acid based polymer are provided as a single solution. In other instances, the treatment water and the aspartic acid based polymer may be provided separately.

In another illustrative laboratory experiment to evaluate the effectiveness of aspartic acid based polymers against halite scale formation, a heated and supersaturated synthetic brine solution was used. The synthetic brine was allowed to cool so that the mitigation of halite formation by the aspartic acid based polymer by measuring any the deposited halite. The synthetic brine was prepared to include water chemistry substantially similar to that given in Table 5 below.

TABLE 5

Simulated brine formulation.

| Ion | Concentration (mg/L) |
|---|---|
| $Na^+$ | 101,680 |
| $Ca^{2+}$ | 20,430 |
| $Mg^{2+}$ | 2,990 |
| $K^+$ | 1,490 |
| $Ba^{2+}$ | 20 |
| $Sr^{2+}$ | 570 |
| $Cl^-$ | 204,297 |
| $HCO_3^{2-}$ | 130 |

The synthetic brine solution was stored and heated at 80° C. until the salts were dissolved. The synthetic brine solution was placed in multiple jars to perform jar tests of various concentrations of the aspartic acid based polymer, where the jars were heated such that the synthetic brine remained at approximately 80° C. The aspartic acid based polymer (e.g., polyaspartate) was added to the individual jars containing the synthetic brine test solution at concentrations from about 0 ppm (e.g., a "blank") to about 300 ppm (e.g., 30 ppm, 40 ppm, 50 ppm, 75 ppm, 200 ppm, and 300 ppm) as a 1% solution in deionized (DI) water. The bottles were then stored at 4° C. for 24 hours and observations made over the test period. The resulting solids observed in the bottles were filtered through a 0.45 micron filter, washed with isopropyl alcohol (IPA) and dried to assess how much scale was present in the "blank" relative to the solutions dosed with the various concentrations of the aspartic acid based polymer. The results are presented below in Table 6.

TABLE 6

Jar test results with the simulated brine of Table 3.

| Polymer concentration (ppm) | Observation (after 24 hours) | Halite mass (grams) | Decrease (%) |
|---|---|---|---|
| Blank (0) | Solids | 1.5127 | N/A |
| 30 | Solids | 1.4418 | 4.69% |
| 40 | Solids | 1.3579 | 10.23% |
| 50 | Solids | 1.2775 | 15.55% |
| 75 | Floc | 0.0014 | 99.91% |
| 200 | Floc | No Solids | 100% |
| 300 | Floc | No Solids | 100% |

As can be seen, a dosage of the aspartic acid based polymer of approximately 75 ppm was effective in minimizing halite scale formation in this test. This test is further discussed in the paper entitled "Successful Deployment of a Green Multifunctional Scale Inhibitor, a Case Study From the Rockies" by Spicka et al., SPE 153952, Society of Petroleum Engineers, 2012, which is herein incorporated by reference in its entirety, particularly for its evaluation of the ability of the multifunctional scale inhibitor to inhibit scale formation of halite and other scales.

Various other scale inhibitor chemistries, such as diethylenetriamine (DETA) phosphonates, phosphate esters and vinyl sulfonated copolymers (Vs-Co), have found use in the oilfields and have been used extensively over many years. These types of chemistries may be used as a comparison when evaluating one or more new scale inhibitors, such as the various aspartic acid based polymers. A laboratory test was performed to compare the ability of an aspartic acid based polymer (e.g., polyaspartate) to inhibit barium sulfate scale (e.g., using a static bottle test) and calcium carbonate scale (e.g., using a dynamic tube block test) using tests common in the oilfield industry. As a result, the aspartic acid based polymer was found to inhibit calcium carbonate scale formation and barium sulfate scale formation at similar levels to other, non-environmentally friendly chemicals, as shown below in Table 7.

TABLE 7

Scale inhibitor comparison.

| Product | Approximate effective Concentration (ppm) |
|---|---|
| DETA Phosphonate | 2 |
| BHMT Phosphonate | 2 |
| Phosphate Ester | 1 |
| Vs-Co | 5 |
| PPCA | 4 |
| Aspartic Acid Based Polymer | 4 |

Several field tests have been done to evaluate the effectiveness of a particular aspartic acid based polymer (e.g., polyaspartate) in hydrocarbon producing subterranean wells having a formation matrix including brine (e.g., a high salinity brine). In a first test, a marginally producing well (e.g., well 1) was a rod pumped well having no production packer and was producing approximately 25 barrels (bbl)/day of oil, approximately 30 thousand cubic feet (MCF)/day of gas, and approximately 150 bbl/day of brine. To control halite formation from the brine described in Table 1, 130 bbl/day of a treatment water (e.g., the fresh water described in Table 2)

was controlled during injection to maintain a ratio of approximately 0.8 bbl of fresh water per 1 bbl of formation water (e.g., the brine). The combination of the fresh water and the formation water caused calcium carbonate scaling on equipment associated with the subterranean well, as indicated in field tests and laboratory tests using environmental scanning electron microscopy (ESEM).

To control halite formation, while simultaneously reducing the use of fresh water, an aspartic acid based polymer (e.g., polyaspartate) was applied to the subterranean well at a concentration of 100 ppm based on total water produced from the well. In some cases, the dosage of the aspartic acid based polymer may be based on the combined volume of the treatment water (e.g., fresh water) injected into the well and volume of the aspartic acid based polymer in solution. In some cases, the dosage concentration of the aspartic acid based polymer may be based on a combination of the combined treatment water volume and the total water produced from the well. The aspartic acid based polymer was introduced into the system by introducing the aspartic acid based polymer into the fresh water source and then injecting the combined treatment water and the aspartic acid based polymer to the formation of the subterranean well via backside treatment. Initially, the treatment water including the aspartic acid based polymer was injected at the same ratio of 0.8 bbl treatment water to 1 bbl formation water.

During this field test, the treatment was monitored and to gradually reduce the amount of inhibited fresh water (e.g., the combination of the treatment water and the aspartic acid based polymer) injected into the subterranean well until to optimize the treatment water use. During the test, to ensure that any halite deposition that may have occurred during the test did not cause production impairment, a 75 bbl slug of fresh water was washed down the casing every two weeks. After stabilization of the treatment regimen, the inhibited fresh water treatment was reduced to 70% of the original volumes. Monitoring of the subterranean well indicated no halite deposition and ESEM analysis of the produced formation water also indicated that calcium carbonate scale was being mitigated when compared to an ESEM image of a filter collected before treatment began.

After six weeks of the reduced fresh water treatment volumes, the injection of inhibited treatment water was reduced by a further 70% to approximately 50% of the original volumes. During this time, no halite formation was observed in the well, indicating that the aspartic acid based polymer was actively inhibiting halite formation. During previous attempts to reduce the fresh water injection volumes with no scale inhibitor present, halite scale formation and/or deposition was seen in the subterranean well and on surfaces of equipment associated with the subterranean well. ESEM filter analysis further indicated continued successful mitigation of calcium carbonate scale as well. After some time and continued success of the aspartic acid based polymer treatment, the injection of inhibited treatment water was further reduced to approximately 25% of the initial volume injected, and this program is currently still being applied successfully.

Over an extended duration, no scale related failures have been reported after implementation of the treatment program. As can be seen in Table 8, there has been no change in the production of formation fluids, only a decrease in the injection of the inhibited fresh water. This 75% reduction in fresh water treatment has resulted in significant savings to the operator due to decreased costs in water transportation and disposal. As a result of the successful treatment the well owner requested that a second well be used for a second field trial. Table 8 shows a comparison of the production values for the well before the treatment program with the aspartic acid based polymer began and after the treatment program had been optimized (e.g., minimization of fresh water use) based on the field test results as described above.

TABLE 8

Results of treatment program on well 1.

| | Pre-treatment (bbl/day) | Optimized treatment (bbl/day) |
|---|---|---|
| Fresh water injection | 138 | 34 |
| Formation water production | 256 | 241 |
| Oil production | 25 | 25.5 |
| Gas production | 41 | 43 |

In the field test at the second well (well 2), the bottom hole temperature of the subterranean well was approximately 280° F., had higher production levels compared to well 1, and produced approximately 900 bbl/day of high salinity formation water (e.g., the brine of Table 9), 163 bbl/day of oil and 219 MCF/day of gas.

TABLE 9

Ion concentrations the high salinity brine of well 2.

| Ion | Concentration (mg/L) |
|---|---|
| $Na^+$ | 66,777 |
| $Ca^{2+}$ | 43,834 |
| $Mg^{2+}$ | 2,789 |
| $K^+$ | 8,421 |
| $Ba^{2+}$ | 56 |
| $Sr^{2+}$ | 992 |
| $Fe^{2+}/Fe^{3+}$ | 12 |
| $Cl^-$ | 230,681 |
| $HCO_3^-$ | 0 |

Well 2 was initially completed with an ESP but was converted to a jet pump just before the start of the chemical program. The formation water was being diluted with 125 bbl/day of fresh water (e.g., the treatment water of Table 10) to control halite scale formation.

TABLE 10

Ion concentrations of the treatment water for well 2.

| Ion | Concentration (mg/L) |
|---|---|
| $Na^+$ | 450 |
| $Ca^{2+}$ | 6 |
| $Mg^{2+}$ | 0 |
| $K^+$ | 1 |
| $Ba^{2+}$ | 0 |
| $Sr^{2+}$ | 0 |
| $Fe^{2+}/Fe^{3+}$ | 0 |
| $Cl^-$ | 72 |
| $HCO_3^-$ | 305 |

Similarly to the treatment program used at well 1, aspartic acid based polymer was introduced into the treatment water before injection into well 2 at a concentration of 100 ppm based upon total produced water volume. The inhibited fresh water (e.g., the combined treatment water and the aspartic acid based polymer) was applied through the power oil line to commingle with the formation water at the bottom of the well. Before the treatment program trial began, calcium carbonate scale formation occurred in the well due to the high temperatures and commingling of incompatible waters and was observed as a deposit on the jet pump when the pump was serviced. Calcium carbonate scale and calcium carbonate scale was also detected via ESEM.

After establishing the chemical treatment and reducing the amount of fresh water used to 70% of initial volumes, ESEM analysis indicated that calcium carbonate scale was being mitigated, along with the mitigating any halite scale. The performance of the aspartic acid based polymer allowed for further reduction in the volume of injected treatment water, allowing the operator to satisfy the local authority's request that fresh water consumption be reduced. The current optimized treatment at Well 2 is injecting fresh water at 50% of initial injection volumes while treating with the multifunctional scale inhibitor based upon produced water volumes.

Due to the lower volumes of injected water used, the pump is able to recover more formation fluids which has allowed the well owner to increase oil and gas production (Table 11).

TABLE 11

Test results for the treatment program at well 2.

| | Pre-treatment (bbl/day) | Optimized treatment (bbl/day) |
|---|---|---|
| Oil production | 126 | 163 |
| Gas production | 163 | 219 |

The revenue from increased production coupled with the cost savings related to water transportation and disposal has resulted in over 1 million dollars in additional revenue for the well owner per year. In other field trials, the aspartic acid based polymer is being successfully used to treat seven wells with a reduction of fresh water injection volumes of in the range from about 25% to about 75% of original volumes while maintaining mitigation of scale formation (e.g., halite scale, calcium carbonate scale, etc. Before the treatment program began, local regulatory authorities had requested that the well operator reduce the consumption of the fresh water taken from the local source used to treat well 2. To comply with the request, attempts to reduce the fresh water injection volumes led to halite deposition and lost production due to downtime. By using the aspartic acid based polymer, the well operator was able to simultaneously minimize scale formation, minimize treatment water use, and increase the productivity of the well The experimental results presented in FIGS. 5A-16B, were performed in a series of jar tests formulated to test the scale inhibition performance for different concentrations of different scale inhibitors (e.g., aspartic acid based polymers and non-aspartic acid based polymers). For example, a first brine, e.g. a sodium/calcium brine was created by adding 37 grams of NaCl and 7.4 grams of $CaCl_2$ to 100 g of water, and heating the water to between about 80° C. and 85° C. A second brine, a sodium chloride based brine, was created by adding 37 g of NaCl to 100 g of water and heating the water to between about 80° C. and 85° C.

FIGS. 5A-5D show experimental results for a series of jar tests 500 using a mixture of a scale inhibitor and deionized water to inhibit scale formation from a brine. The concentration of the scale inhibitor, the aspartic acid based polymer (e.g., polyaspartate) in the deionized water was formulated to be 10,000 ppm, to allow proper dosing of each jar in the jar test, by weight. For example, 0.25 g would provide 100 ppm in 25 grams of brine. In this series of jar tests 500, several jars containing 25 g of the first sodium/calcium based brine were dosed with different concentrations 510 (e.g. 50 ppm, 100 ppm, 200 ppm, and 300 ppm) of the aspartic acid based polymer in deionized water. The jars were left to sit for different specified durations 520 (e.g., 4 hours, 24 hours, and 4 days.). After, the amount of scale was measured after rinsing of any non-adherent scale. The amount of scale present in each of the jar is shown as a percentage of scale inhibition in relation to the blank (e.g., 0 ppm). The tests were repeated three times, as shown in FIGS. 5A-5C and the results averaged and presented in FIG. 5D. As can be seen, even a relatively small dosage of between about 50 ppm and 100 ppm of the aspartic acid based polymer in deionized water may cause a 25% reduction in halite scale formation, and a significant scale reduction may be seen in concentrations between about 100 ppm and 300 ppm.

Figure 6:
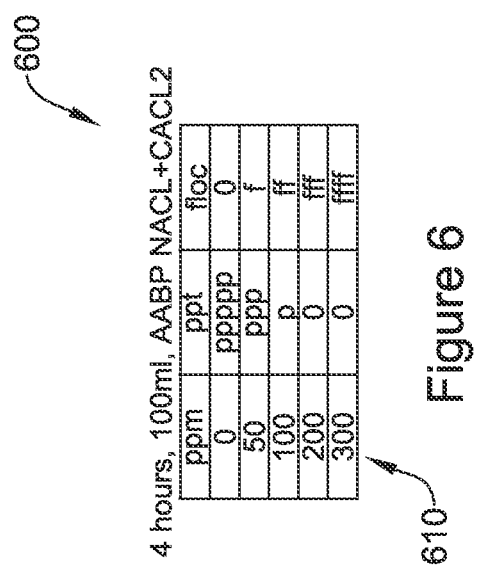
FIG. 6 shows experimental results of a series of jar tests to determine a qualitative understanding of an amount of precipitate and or floc formed at particular dosage levels.

FIG. 6 shows experimental results of a series of jar tests 600 to determine a qualitative understanding of an amount of precipitate and or floc formed at particular dosage levels. In some cases, floc and/or flakes may be formed as part of the scale inhibition process. In some cases, the morphology of the crystals may be changed by the presence of the scale inhibitor, such that crystals that may form may not be able to form scale deposits on a surface and may remain in solution. As can be seen in FIG. 6, scale formation and/or precipitate formation is more prevalent at lower concentration levels 610 of the aspartic acid based inhibitor. As the concentration levels 610 increase, precipitated and adherent scale formation decreases as floc formation may increase.

Figures 7, 8:
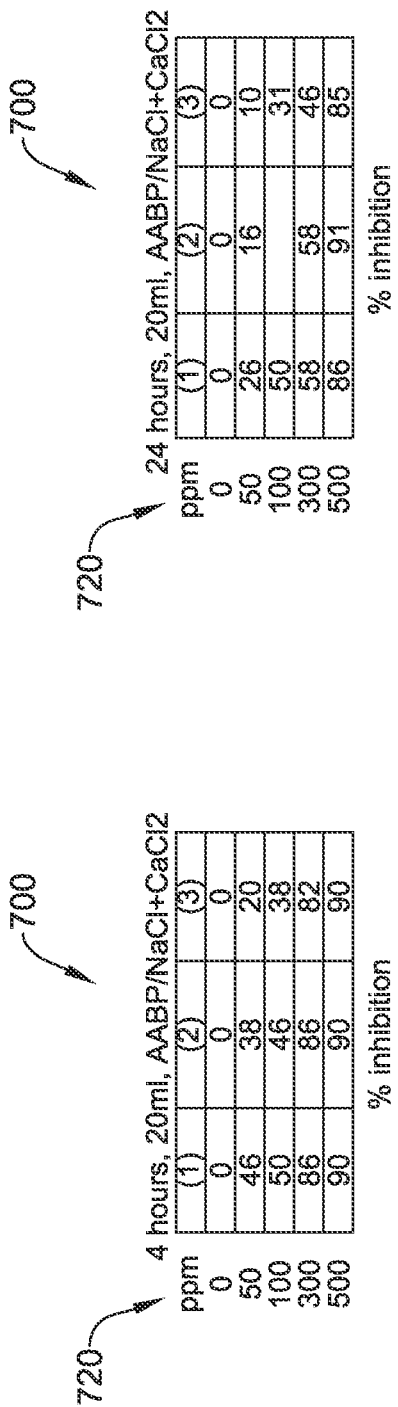
FIGS. 7 and 8 show experimental results from a series of experimental jar tests for particular concentrations levels of the aspartic acid based polymer.

FIGS. 7 and 8 show experimental results from a series of experimental jar tests 700 for particular concentrations levels of the aspartic acid based polymer, similar to the jar tests discussed above in reference to FIGS. 5A-5C. Here, various concentrations 720 of the aspartic acid based scale inhibitor in deionized water were added to jars containing a measured amount of the first sodium/calcium based brine. As can be seen, scale inhibition may decrease between 4 hours and 24 hours in dosages less than about 500 ppm.

FIGS. 9 and 10 show experimental results from a series of experimental jar tests for particular concentrations levels of the aspartic acid based polymer in different brine formulations. Here, FIG. 9 shows a series of 4 hour duration jar tests 810 performed by adding the aspartic acid based polymer in deionized water in particular concentration levels 820 to the first sodium/calcium based brine. FIG. 10 shows a series of 4 hour duration jar tests 830 performed by adding the aspartic acid based polymer in deionized water in particular concentration levels 820 to the second sodium based brine. It is noticeable to see that the scale formation of the second sodium based brine (e.g., 4.49 g of scale at 0 ppm) is much higher than the scale formation of the first sodium/calcium based brine (e.g., 2.3 g of scale at 0 ppm). However at higher dosage levels, such as at 300 ppm, the aspartic acid based polymer solution has a great effect in minimizing halite scale formation.

FIGS. 11 and 12 show experimental results from a series of experimental jar tests 910, 1010 for particular concentrations 920 of an aspartic acid based polymer in different brine formulations similar to the jar tests discussed above in reference to FIGS. 5A-5C and 7 and 8. Here, various concentrations 920 of a different aspartic acid based scale inhibitor, such as an aspartic acid based polymer having a different molecular weight, is combined in solution with deionized water and were added to jars containing a measured amount of the first sodium/calcium based brine. As can be seen, for this aspartic acid based polymer, the ability of this aspartic acid based polymer to inhibit scale formation appears to remain stable between 4 hours and 24 hours at all dosage levels In some cases, a series of experimental jar tests were performed to evaluate the capability of different non-aspartic acid based polymers at various concentrations to inhibit halite scale formation. For example, the different non-aspartic acid based polymers were compared to a water blank to provide a percentage measure of ability of the non-aspartic acid based polymers to inhibit halite scale formation. Several non-biodegradable scale inhibitor polymers provided by Nalco Company—an Ecolab Company of Naperville, Ill. For example, NALCO 46025 is a 4400 MW polyacrylate having a pH 3.2, NALCO 46037 is a 12000 MW terpolymer, acrylic, acrylamide, sulfonate having a pH 5.8, and NALCO 46350 is a 6000 MW copolymer, acrylic and acrylamide having a pH 3.8. Another biodegradable polymer, provided by Dequest AG, a Thermphos company of Vlissingen, Germany is DEQUEST PB11625, which is a <1000 MW carboxymethyl inulin having a pH 7.0. In the jar tests, these non-aspartic acid based polymers were combined in solution with deionized water and added by weight to achieve the desired dosage concentration in the first sodium/calcium brine. The results of the jar tests were inconclusive at best, however, a casual observation of the experimental results showed that carboxymethyl inulin and the highest concentration of the acrylic and acrylamide copolymer appear to have better ability to inhibit scale formation at higher concentration levels than the polyacrylate and the acrylic, acrylamide, sulfonate terpolymer.

In some cases, jar tests were performed to evaluate differences in halite scale inhibition between the operation of the aspartic acid based polymers of differing molecular weights (e.g., between about 2000 and about 15000, about 4000, about 7000, etc.). FIG. 13 shows experimental results for a series of jar tests comparing scale inhibition of different aspartic acid based polymers having different molecular weights Little difference was seen during these particular laboratory experiments. For example, the ability of a solution of a high molecular weight (e.g., about 15000) aspartic acid based polymer and deionized water was seen to be substantially similar to the ability of a solution of a low molecular weight (e.g., about 2000) aspartic acid based polymer and deionized water in inhibiting halite scale formation.

Figure 14:
FIG. 14 shows experimental results for a series of jar tests comparing scale inhibition properties of several aspartic acid based polymers and several non-aspartic acid based polymers.

FIG. 14 shows experimental results for a series of jar tests comparing scale inhibition properties of several aspartic acid based polymers and several non-aspartic acid based polymers 1420, such as NALCO 46025, 46037 and 46350, and DEQUEST11625 discussed above, when added to the second sodium based brine. In the above series of experiments, it was noted that water had the ability to inhibit halite scale formation at least partially by diluting the brine. As such, in the previously discussed experiments, the addition of the additional deionized water in the polymer solution, the scale inhibiting properties of one or more of the tested polymers may not have been properly identified. Based on these results a second series of jar tests 1450 were done using the highest dosage level of 1.25 g of water, for the "blank" and the tested polymers. As shown in FIG. 14, none of the non-aspartic acid based polymers saw as great a reduction in scale formation as did the aspartic acid based polymers. In fact, each of the polyacrylate, the terpolymer of acrylic, acrylamide, sulfonate, and the copolymer of acrylic and acrylamide, each experienced a net increase of scale formation. While the carboxymethyl inulin saw a reduction in halite scale formation, the net reduction was significantly less than the reduction of halite formation for the three different aspartic acid based polymers. Further, the molecular weight difference between each of the different aspartic acid based polymers 1470 did not appear to cause a significant difference in the halite scale inhibition properties between the tested aspartic acid based polymers 1470.

Figure 15B:
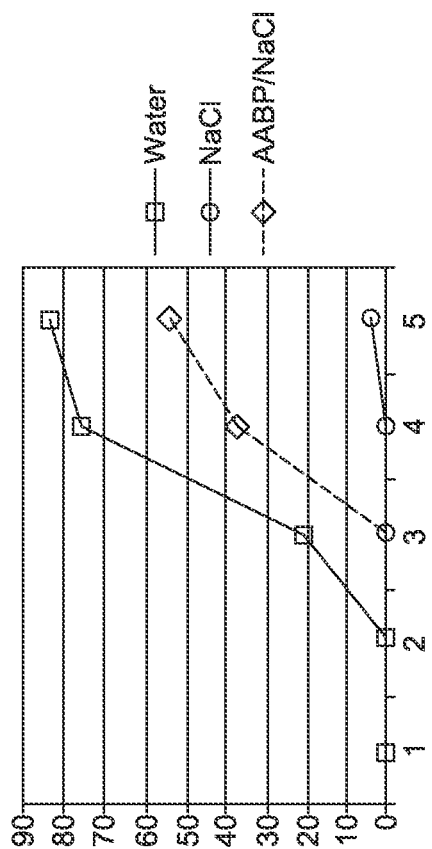
FIGS. 15A and 15B show experimental results for a series of jar tests comparing scale inhibition capabilities of water, brine and a mixture of a scale inhibitor and brine.
Figure 15A:
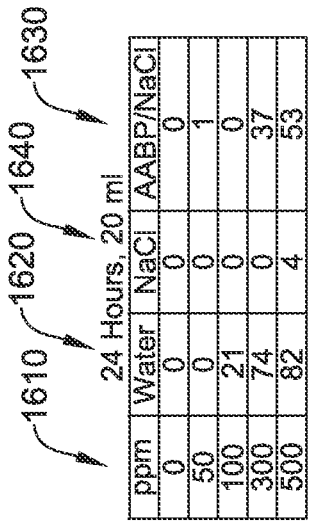
Figure 16B:
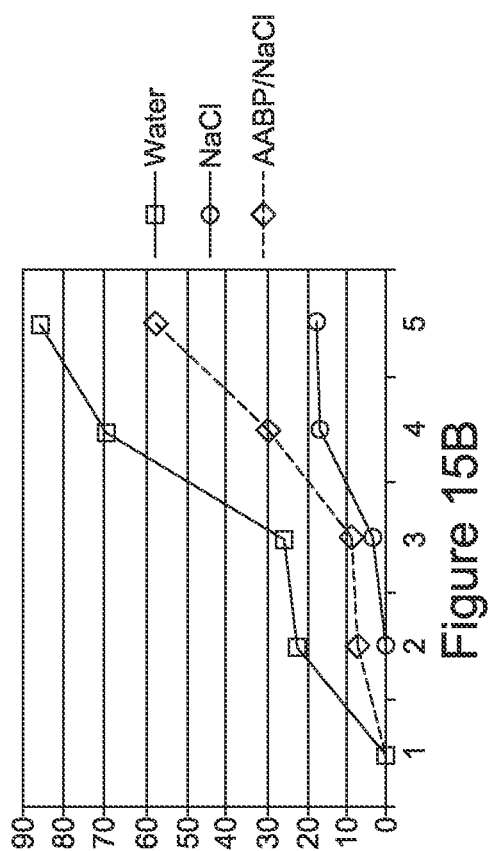
FIGS. 16A and 16B show experimental results for a series of jar tests comparing scale inhibition capabilities of water, brine and a mixture of a scale inhibitor and brine.
Figure 16A:
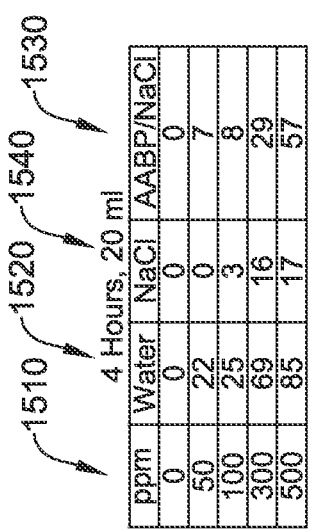

FIGS. 15A and 15B show experimental results for a series of 20 ml jar tests comparing scale inhibition capabilities of water and an aspartic acid based scale inhibitor to a "blank" over a duration of 4 hours in the aforementioned second sodium based brine solution. As before, a series of jars are prepared using different concentrations 1510 of water 1520, an aspartic acid based polymer 1530 and a series of "blank" jars having an addition of the same second sodium chloride based brine 1540. Similarly, FIGS. 16A and 16B show experimental results for a series of 20 ml jar tests comparing scale inhibition capabilities of water and an aspartic acid based scale inhibitor to a "blank" over a duration of 24 hours in the aforementioned second sodium based brine solution. As before, a series of jars are prepared using different concentrations 1610 of water 1620, an aspartic acid based polymer 1630 and a series of "blank" jars having an addition of the same second sodium chloride based brine 1640. As can be seen, both the water additions 1520, 1620 and the aspartic acid based polymer additions 1530, 1630, appear to provide a reduction in halite scale formation, particularly at concentration levels above about 300 ppm. To avoid dilution of the second sodium based brine solution during the aspartic acid based polymer additions 1530, 1630, the aspartic acid based polymer is dissolved in the same second sodium chloride based brine solution. FIGS. 15B and 16B provide a graphical representation of the experimental results shown in the tables of FIGS. 15A and 16A.

Figure 17:
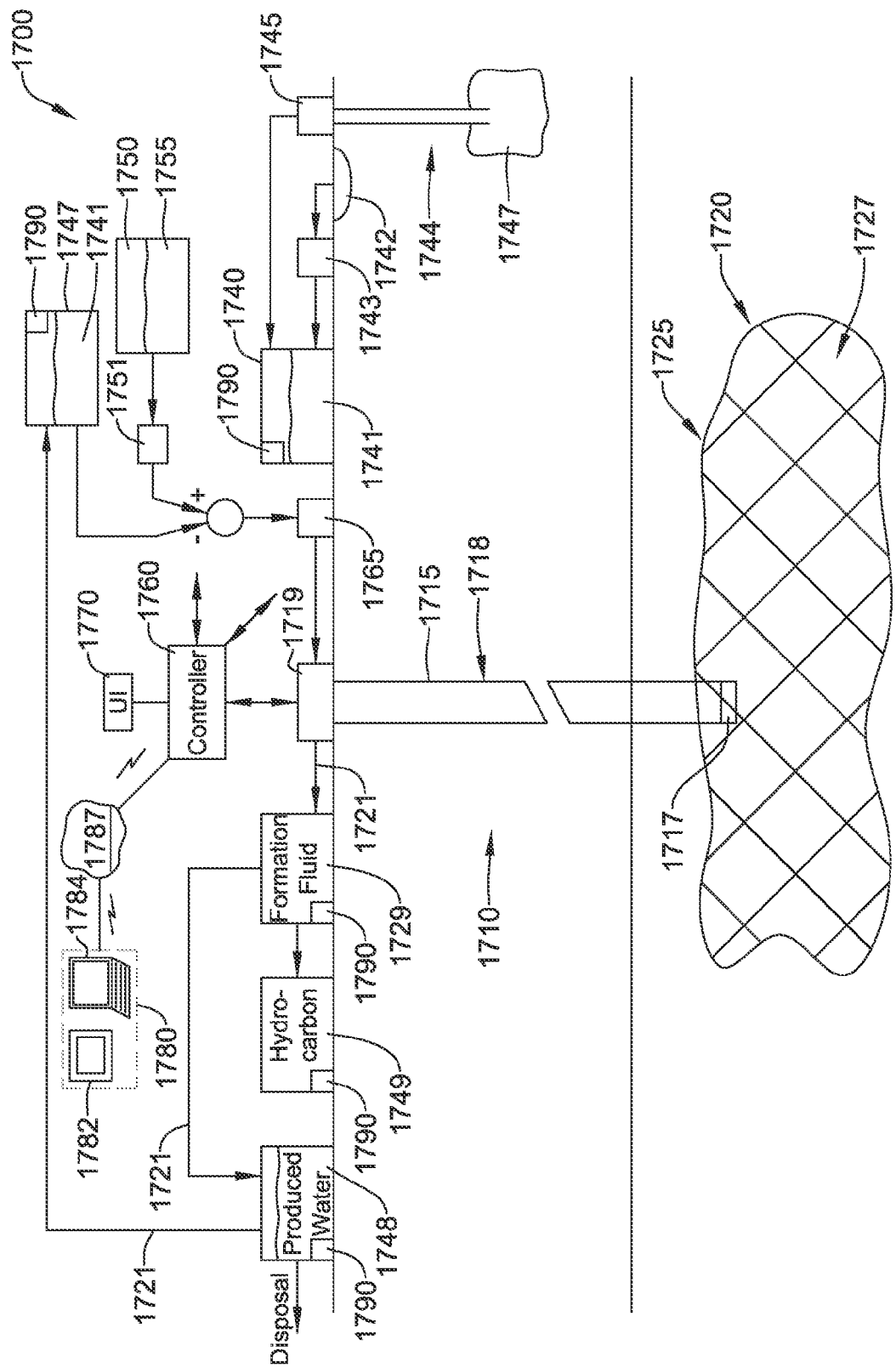
FIG. 17 shows an illustrative system for inhibiting halite scale formation in a hydrocarbon producing well.

FIG. 17 shows an illustrative system 1700 for minimizing scale formation in a subterranean well 1710. The illustrative system 1700 may include the subterranean well 1710 including a well bore 1715 for accessing a hydrocarbon (e.g., oil, natural gas, etc.) containing formation matrix 1720, wherein the desired hydrocarbons 1725 may be found within the formation matrix along with brine 1727. In some cases, the brine may be a high salinity brine, such as the brines described above in Tables 1, 5, and 9. The subterranean well 1710 may include equipment associated with the operation of the hydrocarbon producing well, such as the pumps 1717 and 1719, and tubing and/or pipes 1718 for providing treatment water into the formation matrix 1720 and/or removing a mixture of hydrocarbons 1725 and brine 1727 (e.g., the formation fluid 1729) from the formation matrix to the surface for processing (e.g., separation of the hydrocarbon(s), such as oil and/or natural gas from the brine). As discussed above, the mineral content of the brine 1727 may cause scale formation within the formation matrix (e.g., within pores) and/or on equipment associated with the operation of the subterranean well 1710, such as the down hole pump 1717, the surface pump 1719, tubing and/or pipes 1718, 1721 in contact with the formation fluid (e.g., the mixture and/or emulsion of the hydrocarbons 1725 and the brine 1727, the hydrocarbons 1725 or the brine 1727).

To prevent scale formation within the formation matrix 1720 and/or the equipment associated with the operation of the subterranean well (e.g. the pumps 1717, 81719, and/or the tubing and or pipes 1718, 1721, etc.) treatment water may be provided to the formation matrix 1720 via the tubing and/or pipes 1718 within the well bore 1715. One or more water sources may provide water to be used as the treatment water 1741 for the subterranean well 1710. For example, a water source may include a water holding tank 1740 that may receive water from one or more different water sources, such as a fresh water source including a surface water source 1742 (e.g., a lake, a river, etc.), a well 1744 for accessing water within an aquifer 1747, and the like. For example, the system 1700 may include a pump 1743 for pumping water from the surface water source 1742 to the water holding tank 1740 to be used as the treatment water 1741. Similarly, the system 1700 may include a pump 1745 for pumping water from the well 1744 to the water holding tank 1740 to be used as the treatment water 1741. In some cases, the water sources may include a holding tank 1747 for holding treatment water 1741 obtained from one or more non-fresh water sources, such as a source for formation fluid water (e.g., the brine 1727), a source for reclaimed water (e.g., a waste water treatment facility), a source for production water (e.g., the produced water 1748 separated from the hydrocarbons 1749 from the formation fluid 1729) or the like.

The system 1700 may further include a holding tank 1750, or other storage container, for holding a quantity of the aspartic acid based polymer 1755. In some cases, a pump 1751 may be used to pump the aspartic acid based polymer 1755 to a location to be added to the treatment water, and may be controlled such that a desired concentration is achieved. In some cases, the aspartic acid based polymer may be stored in solution, and/or in a solid form. As discussed above, the aspartic acid based polymer 1755 may include one or more of a copolymer of the aspartic acid based polymer (e.g., glutamic acid, succinic acid, malic acid, maleiamic acid, tartaric acid, aconitic acid, sorbital, etc.), a terpolymer of the aspartic acid based polymer (e.g., glutamic acid, succinic acid, malic acid, maleiamic acid, tartaric acid, aconitic acid, sorbital, etc.), an aspartic acid based polymer derivative (e.g., ethanolamine, taurine, aminopropylquaternary amine and laurlyamine, etc.), an aspartic acid based polymer having an end cap (e.g., adipic acid, citric acid, traurine, benzoic acid, fouric acid, stearic acid, glyphosate, terephthalic acid, trans cinammic acid, etc.), and a soluble salt of the aspartic acid based polymer (e.g., alkali metal and alkali earth metal salts such as sodium, potassium, lithium, ammonium, calcium, barium, etc.). In some cases, the aspartic acid based polymer may include one or more grafts (e.g., acrylic acid, methacrylic acid, vinyl acetate, vinyl sulfonic acid, carbohydrates, polysaccharides, etc.). For example, the aspartic acid based polymer may be polysuccinimide and/or a derivative of polysuccinimide. In some cases, the aspartic acid based polymer may be made using at least one dibasic acid. For example, the dibasic acid may be at least one of, but not limited to, L-aspartic acid, maleic anhydride, glutamic acid, gluataric acid, adipic acid, succinic acid, tartaric acid, malic acid, maliemic acid, fumaric acid, and the like. In some cases, the aspartic acid based polymer may include one or more soluble salts of the aspartic acid based polymer, such as a polyaspartic acid sodium salt.

As discussed above, both the treatment water 1741 and the aspartic acid based polymer 1755 may be used for inhibiting scale formation within the subterranean well 1710 and/or equipment 1717, 1718, 1719, and 1721 associated with the subterranean well 1710. For example, treatment water 1741 may be provided to the subterranean well 1710 to at least partially inhibit scale formation within the subterranean well 1710 and/or on a surface of the equipment 1717, 1718, 1719, and 1721 associated with the subterranean well 1710. Similarly, the aspartic acid based polymer 1755 may be used to at least partially inhibit scale formation within the subterranean well 1710 and/or on a surface of the equipment 1717, 1718, 1719, and 1721 associated with the subterranean well 1710. The aspartic acid based polymer 1755 may be provided to the subterranean well 1710 at a specified concentration in the treatment water 1741 obtained from the one or more water sources 1742, 1743, 1747, 1748.

A controller 1760 may be configured for controlling at least a portion of the operation of the subterranean well 1710. For example, the controller 1760 may be configured to process instructions stored in a non-transitory computer readable medium for providing the treatment water 1741 to the subterranean well 1710 at a specified rate using the pump 1765. The controller 1760 may also be configured to provide the aspartic acid based polymer 1755 to the subterranean well at a specified concentration, such as a specified concentration within the treatment water 1741 and/or a specified concentration corresponding to an amount of water produced from the subterranean well 1710, such as a concentration corresponding to an amount of the produced water 1748 produced from the subterranean well. In some cases, the controller 1760 may be configured to minimize, or otherwise reduce, an amount of water used from the water source by adjusting the rate of flow of the water provided to the subterranean well and/or the concentration of the aspartic acid based polymer.

The system 1700 may include one or more sensors 1790 for analyzing the chemistry of the different waters, such as the treatment water 1741 and/or the produced water 1748, and/or the chemistry of the formation fluid 1729, such as to monitor one or more ion concentration levels. For example, the controller 1760 may be configured to control the concentration and/or flow rate of the aspartic acid based polymer 1755 and/or the flow rate of the treatment water 1741 to ensure proper operation of the subterranean well 1710 and/or to ensure proper inhibition of scale formation.

In some cases, the controller 1760 may include a user interface 1770, or may be associated with a user interface 1770. For example, the user interface 1770 may be used to provide information about the operation of the subterranean well 1710 to a user, including information about scale formation, water use and/or alerts and/or alarms associated with faults and/or other error conditions of the system 1700. In some cases, the controller 1760 may be configured to receive information from a user via the user interface 1770, such as information about a desired flow rate for the treatment water 1741, a desired concentration of the aspartic acid based polymer 1755 and/or information about the mineral content of the treatment water 1741, the produced water 1748 and/or the formation fluid 1729. In some cases, the controller 1760 may include a wired and/or wireless connection to a network 1787, such as a local area network, a wide area network, the internet, a cellular network, and the like. The controller 1760 may be configured to exchange information with one or more device at a remote monitoring site 1780, such as a mobile device 1782 (e.g., a cell phone, a tablet, etc.) and/or a computer 1784. For example, the controller 1760 may be configured to communicate operational information, such as water use rates, aspartic acid based polymer information, water chemistry information, hydrocarbon production rates, and the like. Similarly, the controller 1760 may be configured to receive one or more commands and/or operational set points from the remote monitoring site 1780 that may be used to modify and/or change the operation of the controller 1760, such as by providing a new target rate for treatment water usage, and/or a new concentration level for the aspartic acid based polymer.

Figure 18:
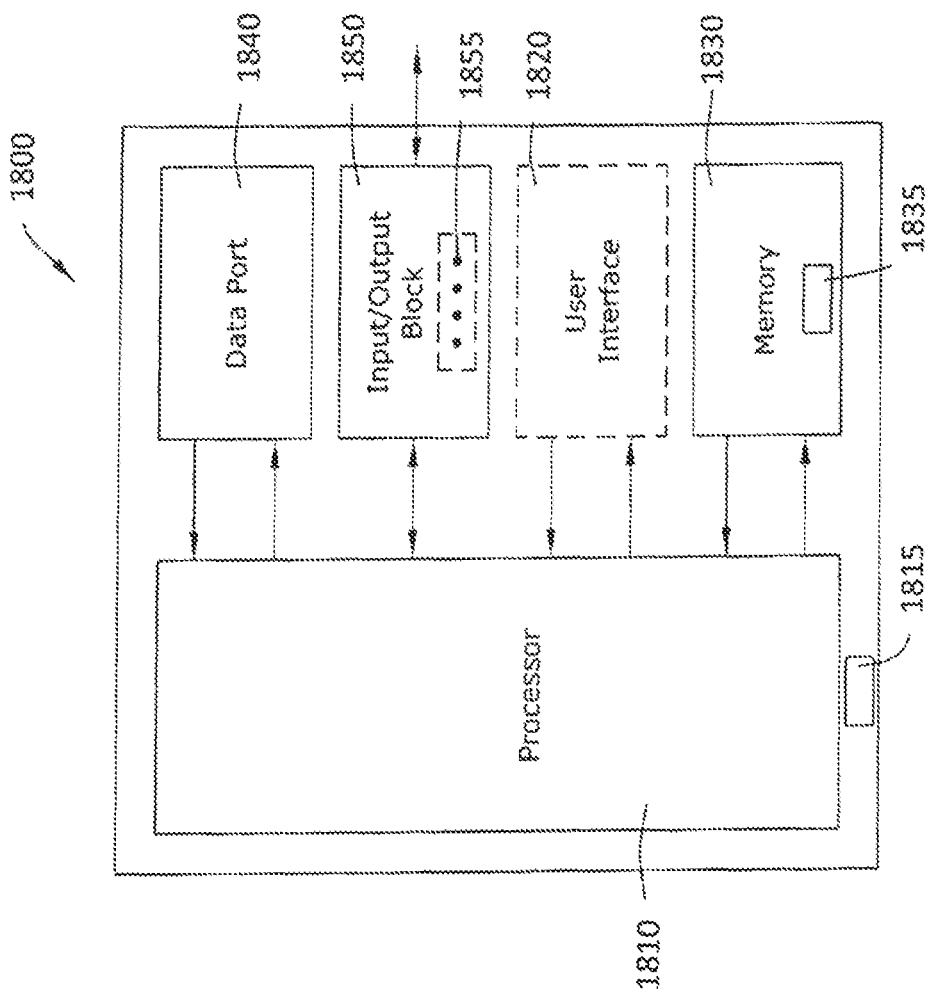
FIG. 18 shows an illustrative controller of the illustrative system of FIG. 17 for controlling treatment water usage and/or a concentration level of an aspartic acid based polymer.

FIG. 18 is a schematic view 1800 of an illustrative controller 1760 of FIG. 17. In some instances, controller 1760 may include one or more sensors 1815, and/or one or more terminals 1855 to connect to a sensor external to the controller 1760, such as the sensors 1790 of FIG. 17, but this is not required. In the illustrative embodiment of FIG. 18, the controller 1760 includes a processor (e.g. microprocessor, microcontroller, etc.) 1810, an optional sensor 1815, an optional user interface 1820, and a memory 1830. The processor 1810 may be coupled to the sensor 1815, the memory 1830, the user interface 1820, and/or the I/O block 1850.

In some cases, the input/output block (I/O block) 1850 may be for receiving one or more signals and/or for providing one or more signals. In one example, the I/O block 1850 may be used to communicate with one or more system components, such as the pumps 1717, 1719, 1743, 1745, and 1751 and/or one or more sensors 1790 of the illustrative system 1700, sometimes via a wired interface. In some cases, the I/O block 1850 may be used to communicate with another controller at another subterranean well and/or a supervisory controller configured to monitor and/or control the operation of two or more subterranean wells, sometime via a wired and/or wireless interface.

The I/O block 1850 may include one or more terminals 1855 (e.g., input terminals, output terminals, universal terminals, etc.) configured to receive control wires from one or more pumps 1717, 1719, 1743, 1745, and 1751, other controllers, and/or sensors 1790. In some cases, the assignment of the terminals 1855 may be programmable, for example a terminal may be configured either as an input or an output, and/or the functionality of a particular terminal may be programmed. In one example, each of the terminals 1855 may be assigned to one or more of the system components and/or building controllers according to the particular installation, and the functionality of each terminal 1855 may depend on a characteristic of the connected devices. For example, one of the terminals 1855 may be configured as an output, such as when the wire terminal is used to provide a command to a pump, and another one of the wire terminals may be configured as an input when the wire terminal is to be used to receive a sensor signal from a sensor such as a sensor for sensing water chemistry (e.g., sensing an ion concentration, sensing a pH, etc.). In other cases, the assignment of the terminals 1855, or some of the terminals 1855, may be fixed.

The processor 1810 of the illustrative controller 1760 may operate by processing control commands received from a supervisory controller and/or command retrieved from the memory 1830, which may control or at least partially controls one or more system components the illustrative system 1700 via the controller 1760. The processor 1810 may, for example, receive specified flow rates and/or concentration levels for the aspartic acid based polymer, and/or concentration levels for a monitored ion concentration in the formation water and/or the produced water (e.g., a calcium ion concentration, and the like from a supervisory controller, from the user interface, and/or from memory, and may control an appropriate system component based on the received information.

In the illustrative embodiment of FIG. 18, the user interface 1820 of the controller 1760, when provided, may be any suitable user interface that permits controller 1760 to display and/or solicit information, as well as accept one or more user interactions. For example, the user interface 1820 may permit a user to enter data such as information about a desired flow rate and/or concentration level, and the like. In some cases, the user interface 1820 may include a display and a distinct keypad. A display may be any suitable display. In some instances, a display may include or may be a liquid crystal display (LCD), and in some cases a fixed segment display or a dot matrix LCD display. If desired, user interface 1820 may be a touch screen LCD panel that functions as both display and keypad.

The memory 1830 of the illustrative controller 1760 may be in communication with the processor 1810. The memory 1830 may be used to store any desired information, such as the aforementioned desired ion concentration levels, the specified concentration of the aspartic acid based polymer, and/or the desired flow rate for the treatment water. The memory may also store one or more algorithms that may be implemented by controller 1760. In some cases, the processor 1810 may operating in accordance with an algorithm that is suitable for controlling the particular system components of the illustrative system 1700 that are connected to the controller 1760 in the particular installation at hand. In some cases, instructions may be stored in the memory 1830 that may allow the processor 1810 to control the treatment water flow and/or the aspartic acid based polymer concentration corresponding to a change in one or more other parameters, such as a change in the rate of production, a change in ion concentration the produced water 1748 and/or the formation fluid 1729, a change in the composition of the treatment water, and the like. In some cases, the memory 1830 may be configured to store instructions for implementing a method of reducing the usage rate of a treatment water and/or for controlling and/or inhibiting scale formation within the subterranean well 1710 and/or on a surface of equipment associated with the operation of the subterranean well 1710, as discussed below.

In some cases, the memory 1830 may be used to store one or more data structures 435 containing information about a configuration of the illustrative system 1700. For example, a data structure 1835 may be used to store information about an association between two or more of a particular treatment water flow rate, a concentration level form the aspartic acid based polymer, an ion concentration of one or more ions in the treatment water, the formation fluid and/or the produced water, a hydrocarbon production rate, and/or other operational information about the operation of the subterranean well. In some cases, the data structure 1835 may include information to issue a command to and/or request information from another controller and/or a user. The memory 1830 may be any suitable type of storage device including, but not limited to, RAM, ROM, EPROM, flash memory, a hard drive, and/or the like. In some cases, processor 1810 may store information within memory 1830, and may subsequently retrieve the stored information. For example, the memory 1830 may be used to store trend information about water usage rates, aspartic acid based concentration levels and/or usage rates, hydrocarbon production rates, water disposal rates, ion concentration levels, and the like.

In some cases, and as illustrated in FIG. 4, controller 1760 may include a data port 1840. The data port 1840 may be a wireless port such as a Bluetooth™ port or any other wireless protocol. In other cases, the data port 1840 may be a wired port such as a serial port, a parallel port, a CAT5 port, a USB (universal serial bus) port, and/or the like. In some instances, the data port 1840 may be a USB port and may be used to download and/or upload information from a USB flash drive or some other data source. Other remote devices may also be employed, as desired.

The data port 1840 may be configured to communicate with processor 1810 and may, if desired, be used to upload information to the processor 1810 and/or download information from the processor 1810. Information that can be uploaded and/or downloaded may include, for example, configuration information, rate information, concentration information, and the like. In some instances, the data port 1840 may be used to upload a previously-created controller configuration into the processor 1810, thereby hastening the configuration process. For example, one or more subterranean wells may include water chemistry and/or brine chemistry similar to a different well and a different location. In some cases, the data port 1840 may be used to download a controller configuration that has been created using the controller 1760, so that the controller configuration may be transferred to other similar subterranean well system controllers, hastening their configuration process. In some cases, the data port

1840 may be used to download data stored within the memory 1830 for analysis. For example, data port 1840 may be used to download a trend log, a fault and/or alert log or parts thereof to a remote device such as a USB memory stick (also sometimes referred to as a thumb drive or jump drive), personal computer, laptop, iPAD® or other tablet computer, PDA, smart phone, or other remote device, as desired. In some cases, the data may be convertible to an MS EXCEL®, MS WORD®, text, XNL, and/or Adobe PDF® file, but this is certainly not required.

In some cases, a method for reducing an amount of water injected into a subterranean well may include providing an aspartic acid based polymer to the subterranean well, and instructions for performing the method may be at least partially stored in the memory 1830 of the controller. In some cases, the aspartic acid based polymer may include one or more of a copolymer of the aspartic acid based polymer, a terpolymer of the aspartic acid based polymer, an aspartic acid based polymer derivative, an aspartic acid based polymer having an end cap, and a soluble salt of the aspartic acid based polymer. For example, the aspartic acid based polymer may be polysuccinimide and/or a derivative of polysuccinimide. In some cases, the aspartic acid based polymer may be made using at least one dibasic acid. For example, the dibasic acid may be at least one of L-aspartic acid, maleic anhydride, and/or fumaric acid. In some cases, the aspartic acid based polymer may include one or more soluble salts of the aspartic acid based polymer, such as a polyaspartic acid sodium salt.

In some cases, providing an aspartic acid based polymer to the subterranean well may include providing the aspartic acid based polymer at a specified concentration in a fluid, where the specified concentration of the aspartic acid based polymer may be provided within a range from about 1 ppm to about 1000 ppm. In an illustrative example, the concentration of the aspartic acid based polymer may include a concentration of polyaspartic acid and/or a polyaspartic acid salt at a concentration within a range between about 1 part per million (ppm) to about 1000 ppm.

In some cases, the method of reducing an amount of water injected into the subterranean well may include inhibiting the crystallization and/or precipitation of sodium chloride (e.g., halite). For example, the water injected into the subterranean well, the aspartic acid based polymer provided to the subterranean well, or a combination of both the water injected into the subterranean well and the aspartic acid based polymer provided to the subterranean well may inhibit crystallization and/or precipitation of sodium chloride and/or one or more other crystals and/or scale forming substances, such as calcium chloride and/or barium sulfate. In some cases, the method of reducing an amount of water injected into the subterranean well may include injecting a combination of the aspartic acid based polymer and treatment water from at least one water source, wherein the treatment water may be obtained from one or more of a surface water source (e.g., a river, a lake, a pond, etc.), a well water source, a reclaimed water source, a waste water source, a production water source and/or a fracturing fluid source. In some cases, the method of reducing an amount of water injected into the subterranean well may include reducing an amount of treatment water injected into the well by about 5 percent to about 95 percent. In some cases, an amount of treatment water obtained from a fresh water source (e.g., a river, a lake, other surface water sources, a fresh water well, etc.) may be reduced using an amount of water obtained from another source, such as a reclaimed water source, a waste water source, a production water source and/or a fracturing fluid source, use of the aspartic acid based polymer and/or a combination of water obtained from another source and the aspartic acid based polymer. For example, water may be obtained by reclaiming water from a water treatment facility, from water separated from the formation fluid containing a mixture of a hydrocarbon and/or a brine, and the like.

Figure 19:
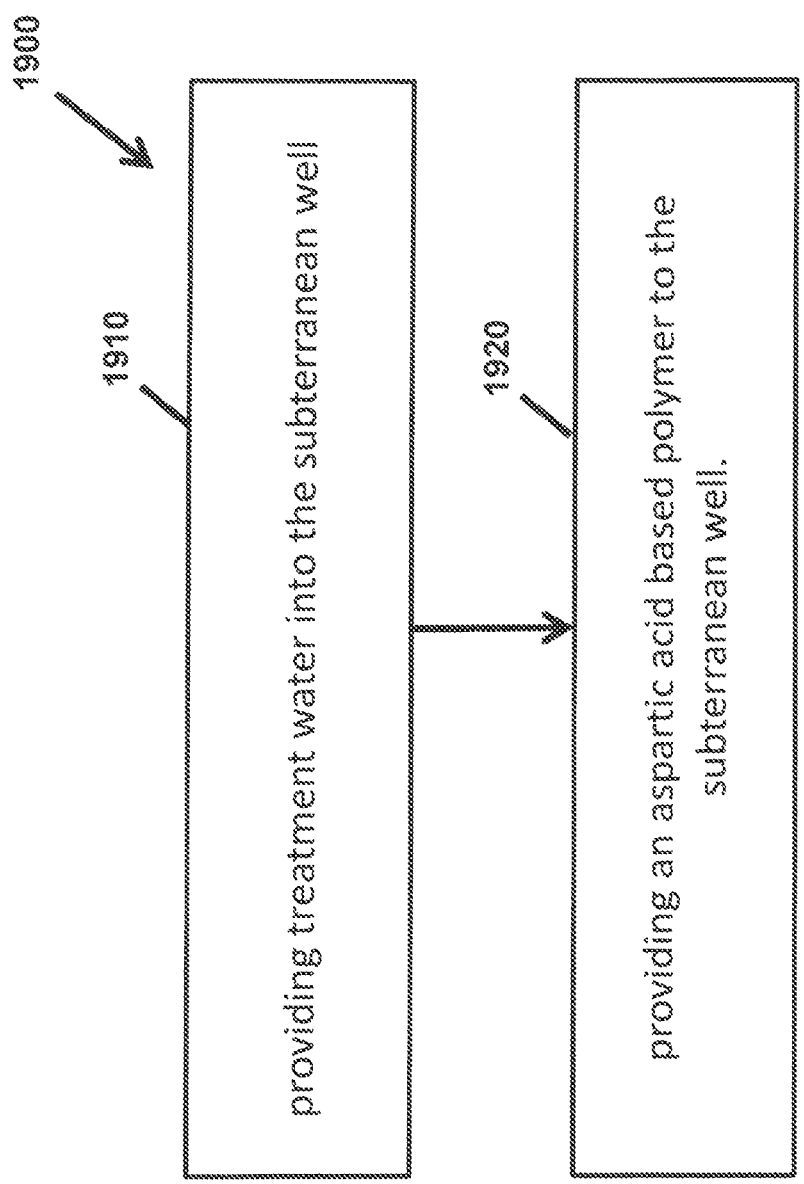
FIG. 19 shows an illustrative method for inhibiting scale formation in a subterranean well and/or equipment associated with the subterranean well.

In another example, as shown in FIG. 19, a method for inhibiting scale formation in a subterranean well and/or equipment associated with the subterranean well The method 1900 may, at 1910, begin by providing treatment water into the subterranean well. For example, providing treatment water into the subterranean well may include injecting the treatment water into the subterranean well at a first specified rate and/or adjusting a rate of injection of the treatment water into the subterranean well to a second rate of injection, wherein the second rate of injection is less than a first rate of injection. At 1920, an aspartic acid based polymer may be provided to the subterranean well. In some cases, the aspartic acid based polymer is provided to the subterranean well with the treatment water at a concentration between 1 part per million (ppm) and 1000 ppm. For example, the aspartic acid based polymer may be provided to the subterranean well at a rate that results in a specified concentration of the aspartic acid based polymer in the treatment water between about 25 parts per million (ppm) and 500 ppm. In some cases, the method for inhibiting scale formation in the subterranean well and/or equipment associated with the subterranean well may include adjusting a concentration of the aspartic acid based polymer in the treatment water.

The method of FIG. 19 may further include inhibiting sodium chloride scale and/or inhibiting one or more other scale formation (e.g., a calcium carbonate scale formation, a barium sulfate scale formation, and the like) within a formation matrix associated with the subterranean well and/or on equipment associated with the subterranean well using the aspartic acid based polymer. In some cases, the aspartic acid based polymer may include one or more of a copolymer of the aspartic acid based polymer, a terpolymer of the aspartic acid based polymer, an aspartic acid based polymer derivative, an aspartic acid based polymer having an end cap, and a soluble salt of the aspartic acid based polymer. For example, the aspartic acid based polymer may be polysuccinimide and/or a derivative of polysuccinimide. In some cases, the aspartic acid based polymer may be made using at least one dibasic acid. For example, the dibasic acid may be at least one of, but not limited to, L-aspartic acid, maleic anhydride, gluataric acid, adipic acid, succinic acid, tartaric acid, malic acid, maliemic acid, fumaric acid, and the like. In some cases, the aspartic acid based polymer may include one or more soluble salts of the aspartic acid based polymer, such as a polyaspartic acid sodium salt. As discussed above, instructions for performing the method 1900 of FIG. 19 may be at least partially stored in the memory 1830 for use by the processor 1810 of the controller 1760.

Having thus described several illustrative embodiments of the present disclosure, those of skill in the art will readily appreciate that yet other embodiments may be made and used within the scope of the claims hereto attached. Numerous advantages of the disclosure covered by this document have been set forth in the foregoing description. It will be understood, however, that this disclosure is, in many respect, only illustrative. Changes may be made in details, particularly in matters of shape, size, and arrangement of parts without exceeding the scope of the disclosure. The disclosure's scope is, of course, defined in the language in which the appended claims are expressed.

What is claimed is:

1. A method for reducing a volume of water injected into an existing subterranean well during hydrocarbon production for sodium chloride inhibition, the method comprising:
   pumping a formation fluid including a hydrocarbon and a produced water from the subterranean well wherein the subterranean well includes a brine including sodium chloride;
   adding a flow of treatment water to the subterranean well at a first ratio of treatment water to produced water;
   adding an aspartic acid based polymer from a storage tank to a mixing location to be mixed with the treatment water;
   pumping the aspartic acid based polymer and the treatment water mixture from the mixing location to the subterranean well at a second ratio of treatment water to produced water, wherein the second ratio is less than the first ratio in order to reduce a total volume pumped into subterranean well; and
   monitoring an ion concentration of the produced water;
   wherein the produced water is a combination of a brine including sodium chloride and the aspartic acid based polymer and treatment water mixture, wherein the aspartic acid based polymer inhibits crystallization of sodium chloride from the brine.

2. The method of claim 1, wherein the aspartic acid based polymer includes one or more of a copolymer of the aspartic acid based polymer, a terpolymer of the aspartic acid based polymer, an aspartic acid based polymer derivative, an aspartic acid based polymer having an end cap, and a soluble salt of the aspartic acid based polymer.

3. The method of claim 2, wherein the aspartic acid based polymer is polysuccinimide and/or a derivative of polysuccinimide.

4. The method of claim 2, wherein the aspartic acid based polymer is made from at least one dibasic acid.

5. The method of claim 4, wherein the at least one dibasic acid is at least one of L-aspartic acid, maleic anhydride, fumaric acid, glutamic acid, gluataric acid, adipic acid, succinic acid, tartaric acid, malic acid, and/or maliemic acid.

6. The method of claim 1, wherein the aspartic acid based polymer is a polyaspartic acid sodium salt.

7. The method of claim 1, wherein providing the aspartic acid based polymer to the subterranean well further comprises providing the aspartic acid based polymer at a first specified concentration to result in a second specified concentration in the produced water.

8. The method of claim 7, wherein the first specified concentration of the aspartic acid based polymer is within a range from about 1 part per million (ppm) to about 10000 ppm.

9. The method of claim 8, wherein the first specified concentration of the aspartic acid based polymer includes a concentration of polyaspartic acid derivative and/or a polyaspartic acid salt within a range between about 1 part per million (ppm) to about 10000 ppm.

10. The method of claim 1, wherein the treatment water includes water from one or more of a surface water source, a well water source, a reclaimed water source, a waste water source, a production water source and/or a fracturing fluid source.

11. The method of claim 1, wherein the second ratio of treatment water to produced water is about 5 percent to about 95 percent of the first ratio of treatment water to produced water.

12. A method for inhibiting scale formation in an existing subterranean well during hydrocarbon production, the method comprising:
   pumping treatment water to a mixing location;
   mixing an aspartic acid based polymer into the treatment water at the mixing location;
   pumping the mixed treatment water and aspartic acid based polymer to the subterranean well at a first specified rate;
   adjusting a rate of injection of the treatment water into the subterranean well to a second rate of injection, wherein the second rate of injection is less than a first rate of injection such that a smaller volume of water is injected into the subterranean well in order to reduce a total volume pumped into subterranean well; and;
   monitoring an ion concentration of the produced water; and
   adjusting a concentration of the aspartic acid based polymer in the treatment water based at least in part on the ion concentration of the produced waters;
   wherein the aspartic acid based polymer inhibits crystallization of sodium chloride in the subterranean well.

13. The method of claim 12, wherein the aspartic acid based polymer is provided to the subterranean well with the treatment water at a concentration between 1 part per million (ppm) and 1000 ppm.

14. The method of claim 12, wherein the aspartic acid based polymer is provided into the subterranean well at a rate that results in a specified concentration of the aspartic acid based polymer in the treatment water between about 25 parts per million (ppm) and 500 ppm.

15. The method of claim 14, comprising inhibiting at least one of a calcium carbonate scale formation or a barium sulfate scale formation.

16. The method of claim 12, further comprising inhibiting sodium chloride scale within a formation matrix associated with the subterranean well and/or on equipment associated with the subterranean well.

17. The method of claim 12, wherein the aspartic acid based polymer is polysuccinimide and/or a derivative of polysuccinimide.

18. A system for minimizing scale formation in an existing subterranean well during hydrocarbon production, the system comprising:
   a treatment water storage tank including a sensor for measuring an ion concentration of the treatment water in the water storage tank;
   a storage tank including an aspartic acid based polymer;
   a mixing location configured to mix the treatment water and the aspartic acid based polymer at a specified concentration, wherein the mixed treatment water and aspartic acid based polymer are provided to the subterranean well to at least partially inhibit sodium chloride crystallization within the subterranean well;
   a produced water storage tank including a sensor for measuring an ion concentration of a produced water in the produced water storage tank; and
   a controller configured to control a rate of flow of the treatment water to the subterranean well such that a total volume of treatment water provided to the subterranean well is reduced over a period of time.

19. The system of claim 18, wherein the controller is further configured to control a concentration of the aspartic acid based polymer in the water provided to the subterranean well.

20. The system of claim 19, wherein the controller is configured to minimize an amount of the treatment water used from the treatment water storage tank by adjusting the concentration of the aspartic acid based polymer.

21. The system of claim 18, further comprising a pump configured to obtain a formation fluid from the subterranean well.

22. The system of claim 21, wherein a combination of the treatment water and the aspartic acid based polymer minimizes scale formation on surfaces associated with the pump and/or within a formation matrix associated with the subterranean well.

23. The method of claim 1, wherein pumping the aspartic acid based polymer and treatment water mixture from the mixing location to the subterranean well comprises pumping the aspartic acid based polymer and treatment water mixture on a continuous or variable basis.

* * * * *